US011507885B2

(12) United States Patent
Tsuneki et al.

(10) Patent No.: US 11,507,885 B2
(45) Date of Patent: Nov. 22, 2022

(54) MACHINE LEARNING DEVICE, CONTROL DEVICE, AND MACHINE LEARNING SEARCH RANGE SETTING METHOD

(71) Applicant: FANUC CORPORATION, Yamanashi (JP)

(72) Inventors: Ryoutarou Tsuneki, Yamanashi (JP); Satoshi Ikai, Yamanashi (JP); Takaki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 540 days.

(21) Appl. No.: 16/738,416

(22) Filed: Jan. 9, 2020

(65) Prior Publication Data
US 2020/0257252 A1 Aug. 13, 2020

(30) Foreign Application Priority Data
Feb. 12, 2019 (JP) .............................. JP2019-022798

(51) Int. Cl.
*G05B 13/02* (2006.01)
*G06N 20/00* (2019.01)
(Continued)

(52) U.S. Cl.
CPC ......... *G06N 20/00* (2019.01); *G05B 13/0265* (2013.01); *G05B 13/042* (2013.01);
(Continued)

(58) Field of Classification Search
CPC ...... G06N 3/0481; G06N 3/126; G06N 20/00; E21B 47/008; B25J 9/163; G05B 13/0265
See application file for complete search history.

(56) References Cited

U.S. PATENT DOCUMENTS

| 10,026,506 B1* | 7/2018 | LaBorde .............. G06N 3/0481 |
| 2017/0147722 A1* | 5/2017 | Greenwood .......... G06N 3/126 |
| 2017/0235284 A1* | 8/2017 | Watson ................ E21B 47/008 |
| | | 700/31 |

FOREIGN PATENT DOCUMENTS

| JP | WO2005/029479 | 11/2006 |
| JP | 2017-27570 | 2/2017 |
| JP | 2018-180764 | 11/2018 |

OTHER PUBLICATIONS

Hatakenaka, Kisho, CN 106406235A, "Simulating Devicee, Machine Tool and Machine Learning" (translation), Feb. 15, 2017, 14 pgs <CN_106406235A.pdf>.*

(Continued)

*Primary Examiner* — Tuan A Vu
(74) *Attorney, Agent, or Firm* — Wenderoth, Lind & Ponack, LLP

(57) ABSTRACT

A machine learning device that searches for a first parameter of a component of a servo control device that controls a servo motor includes: a solution detection unit that acquires a set of evaluation function values used during machine learning or after machine learning, plots the set of evaluation function values in a search range of the first parameter or a second parameter used for searching for the first parameter, and detects whether a search solution is at an edge of the search range or is in a predetermined range from the edge; and a range changing unit that changes the search range to a new search range of the first parameter or the second parameter based on the estimation made on evaluation function values of an evaluation function expression when the search solution is at the edge of the search range or is in the predetermined range.

7 Claims, 14 Drawing Sheets

(51) Int. Cl.
  *G05B 13/04*   (2006.01)
  *G06N 5/00*    (2006.01)
  *G06N 3/04*    (2006.01)
  *G06N 3/12*    (2006.01)
  *E21B 47/008*  (2012.01)
  *B25J 9/16*    (2006.01)

(52) U.S. Cl.
  CPC ............... *G06N 5/003* (2013.01); *B25J 9/163* (2013.01); *E21B 47/008* (2020.05); *G05B 2219/33027* (2013.01); *G06N 3/0481* (2013.01); *G06N 3/126* (2013.01)

(56) References Cited

OTHER PUBLICATIONS

Shreyas et al, "Modern Machine Learning Approaches for Robotic Path Planning", IJCSIT, vol. 8 (2), 2017, pp. 256-259 <pathPlanning.pdf>.*

Notification of Reasons for Refusal dated Apr. 20, 2021 in Japanese Application No. 2019-022798.

* cited by examiner

MACHINE LEARNING DEVICE, CONTROL DEVICE, AND MACHINE LEARNING SEARCH RANGE SETTING METHOD

This application is based on and claims the benefit of priority from Japanese Patent Application No. 2019-022798, filed on 12 Feb. 2019, the content of which is incorporated herein by reference.

BACKGROUND OF THE INVENTION

Field of the Invention

The present invention relates to a machine learning device, a control device, and a machine learning search range setting method, and particularly, to a machine learning device, a control device, and a machine learning search range setting method for searching for parameters of components of a servo control device that controls a servo motor that drives an axis of a machine tool, a robot, or an industrial machine.

Related Art

As a technology related to the present invention, method of optimizing recording/reproducing conditions of an optical disc by changing a search range of a recording power is known. For example, Patent Document 1 discloses that "since there is a possibility that a recording power providing a smaller litter value can be detected by expending the search range of recording power, when the minimum jitter value has been detected at an edge of the search range of recording power, it is necessary to detect the minimum jitter value again by changing the search range of recording power".

Patent Document 1: Republished International Patent Publication No. WO2005/029479

SUMMARY OF THE INVENTION

Although search range of machine learning is set in advance when a machine learning device searches for the parameters of the components of a servo control device that controls a servo motor that drives an axis of a machine tool, a robot, or an industrial machine, there is a case in which the search range is not an appropriate range.

(1) An aspect the present disclosure provides a machine learning device that searches for a first parameter of a component of a servo control device that controls a servo motor that controls an axis of a machine tool, a robot, or an industrial machine, the machine learning device including: a search solution detection unit that acquires a set of evaluation function values used for machine learning device during machine learning or after machine learning, plots the set of evaluation function values in a search range of the first parameter or a second parameter used for searching for the first parameter, and detects whether a search solution at an edge of the search range or in a predetermined range from the edge; an evaluation function expression estimation unit that estimates an evaluation function expression on the basis of the set of evaluation function values when the search solution is at the edge of the search range or is in the predetermined range; and a search range changing unit that changes the search range to a new search range of the first parameter or the second parameter on the basis of the estimated evaluation function expression.

(2) Another aspect of the present disclosure provides a control device including: the machine learning device according to; and a servo control device that controls a servo motor that drives an axis of a machine tool, robot, or an industrial machine, wherein the machine learning device searches for a first parameter of a component of the servo control device.

(3) Still another aspect of the present disclosure provides a search range setting method in a machine learning device that searches for a first parameter of a component of a servo control device that controls a servo motor that controls an axis of a machine tool, a robot, or an industrial machine, the search range setting method including: plotting a set of evaluation function values used for machine learning during machine learning or after machine learning in a search range of the first parameter or a second parameter used for searching for the first parameter; detecting whether a search solution is at an edge of the search range or is in a predetermined range from the edge; estimates an evaluation function expression on the basis of the set of evaluation function values when the search solution is at the edge of the search range or is in the predetermined range; and changes the search range to a new search range of the first parameter or the second parameter on the basis of the estimated evaluation function expression.

DETAILED DESCRIPTION OF THE INVENTION

Hereinafter, embodiments of the present disclosure will be described.

First Embodiment

Figure 1:
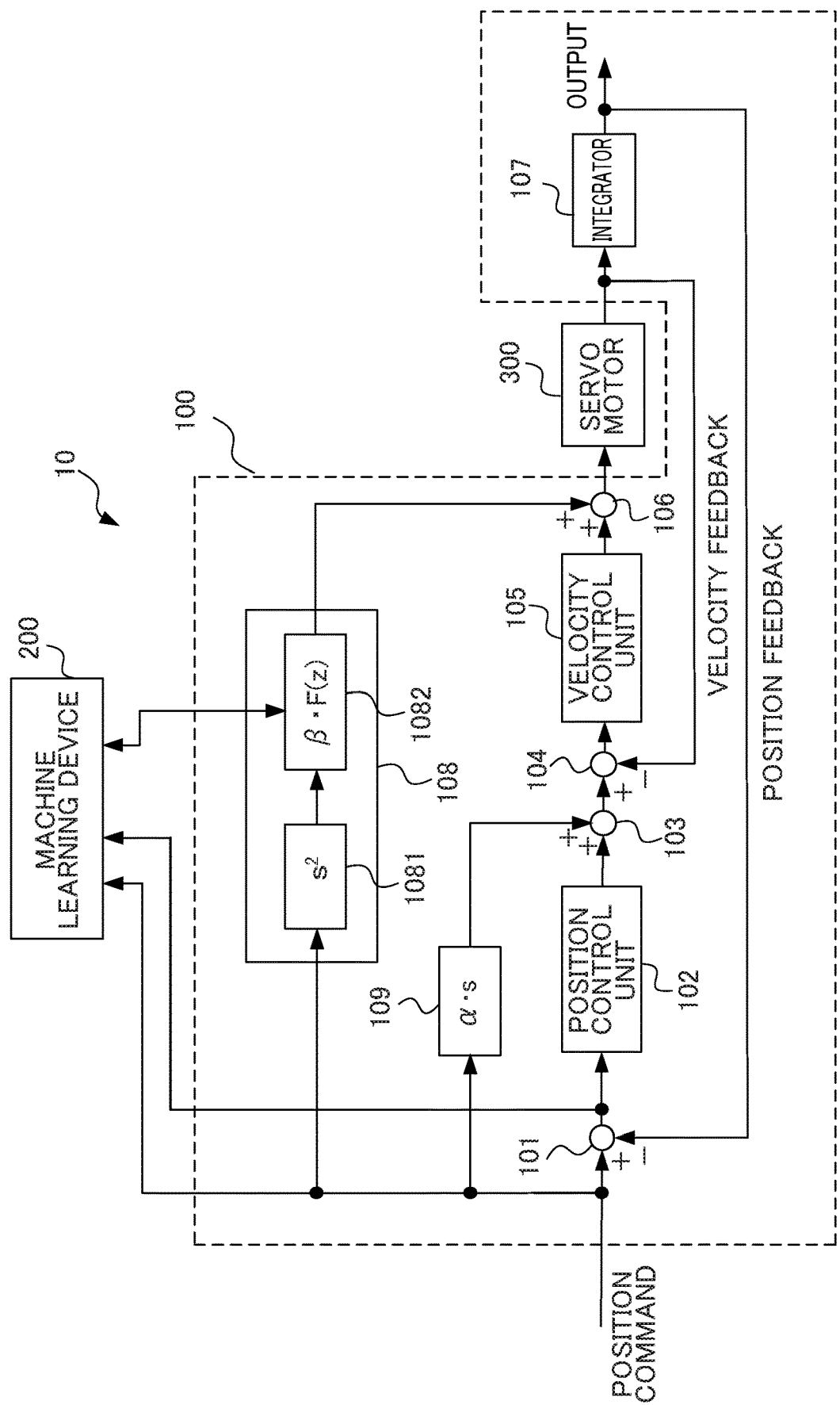
FIG. 1 is a block diagram illustrating a configuration example of a control device according to a first embodiment of the present disclosure.

FIG. 1 is a block diagram illustrating a configuration example of a control device according to a first embodiment of the present disclosure. A control device 10 illustrated in FIG. 1 includes a servo control device 100 and a machine learning device 200.

A servo motor 300 is a control target of the servo control device 100 and is included in a machine tool, a robot, or an industrial machine, for example. The servo control device 100 may be provided as a part of a machine tool, a robot, or an industrial machine together with the servo motor 300.

First, the servo control device 100 will be described. As illustrated in FIG. 1, the servo control device 100 includes, as its components, a subtractor 101, a position control unit 102, an adder 103, a subtractor 104, a velocity control unit 105, an adder 106, an integrator 107, a velocity feedforward unit 108, and a position feedforward unit 109. The velocity feedforward unit 108 includes a double differentiator 1081 and an IIR filter unit 1082.

A position command is output to the subtractor 101, the velocity feedforward unit 108, the position feedforward unit 109, and the machine learning device 200. The position command is created by a host device on the basis of a program for operating the servo motor 300. The servo motor 300 is included in a machine tool, for example. In a machine tool, when a table having a workpiece (work) mounted thereon is moved in an X-axis direction and a Y-axis direction, the servo control device 100 and the servo motor 300 illustrated in FIG. 1 are provided in the X-axis direction and the Y-axis direction, respectively. When the table is moved in the direction of three or more axes, the servo control device 100 and the servo motor 300 are provided in the respective axial directions. The position command set, a feed rate so that a machining shape designated by a machining program is obtained.

The subtractor 101 calculates a difference between a position command value and a feedback detection position and outputs the difference to the position control unit 102 and the machine learning device 200 as a position error. The position control unit 102 outputs a value obtained by multiplying the position error by a position gain Kp to the adder 103 as a velocity command value. The adder 103 adds the velocity command value and an output value (position feedforward term) of the position feedforward unit 109 and outputs an addition result to the subtractor 104 as a feedforward-controlled velocity command value. The subtractor 104 calculates a difference between the output of the adder 103 and a feedback velocity detection value and outputs the difference to the velocity control unit 105 as a velocity error.

The velocity control unit 105 adds a value obtained by multiplying and integrating the velocity error by an integral gain K1v to a value obtained by multiplying the velocity error by an integral gain K2v and outputs an addition value to the adder 106 as a torque command value. The adder 106 adds the torque command value and an output value (velocity feedforward term) of the velocity feedforward unit 108 and outputs an addition value to the servo motor 300 via a current control unit (not illustrated) as a feedforward-controlled torque command value to drive the servo motor 300.

A rotational angular position of the servo motor 300 is detected by a rotary encoder serving as a position detection unit, associated with the servo motor 300, and a velocity detection value is input to the subtractor 104 as a velocity feedback. The velocity detection value is integrated by the integrator 107 to be a position detection value, and the position detection value is input to the subtractor 101 as a position feedback. The servo motor may be a linear motor.

The double differentiator 1081 of the velocity feedforward unit 108 differentiates the position command value twice, and the IIR filter unit 1082 performs an IIR filter process represented by a transfer function β·F(z) on the output of the double differentiator 1081. The processing result is output to the adder 106 as a velocity feedforward term. The transfer function β·F(z) of the IIR filter unit 1082 is obtained by multiplying a transfer function F(z) of the IIR filter by a constant β. The optimal values of the coefficients $a_0$, $a_1$, $r_0$, and $\omega_n t_s$ of the transfer function F(z) of the IIR filter represented by Expression 1 (indicated as Math. 1 below) are machine-learned by the machine learning device 200. The coefficient $r_0$ indicates an attenuation coefficient (damping), the coefficient $\omega_n$ indicates a central angular frequency of attenuation, and the coefficient $t_s$ indicates a sampling time. When the velocity feedforward unit 108 is a component of the servo control device and machine-learns the coefficients r and $\omega_n t_s$, the coefficients r and $\omega_n t_s$ are first parameters.

$$F(z) = \frac{(z - \mathrm{re}^{j\omega_n t_s})(z - \mathrm{re}^{-j\omega_n t_s})}{z^2 + a_1 z + a_0} \quad [\text{Math. 1}]$$

Although the denominator and the numerator of the transfer function F(z) of the IIR filter are quadratic functions in this example, the denominator and the numerator are not particularly limited to a quadratic function but may be a cubic function or a higher-order function.

The position feedforward unit 109 differentiates the position command value, multiplies a differentiation result by a constant α, and outputs the processing result to the adder 103 as a position feedforward term. The servo control device 100 is configured in this manner. Next, the machine learning device 200 will be described.

The machine learning device 200 searches for a zero-point which z at which the transfer function F(z) of the IIR filter of the velocity feedforward unit 108 by executing a predetermined machining program (hereinafter also referred to as a "learning machining program"). The pole is the value of z at which the transfer function F(z) is infinity and the zero-point is the value of z at which the transfer function F(z) is 0. Although the machine learning device 200 may search for a pole and a zero-point, a zero-point is important in suppressing vibration. In this example, a case in which the machine learning device 200 searches for a zero-point to optimize the coefficients r and $\omega_n t_s$ while fixing the pole (fixing the coefficients $a_0$ and $a_1$) will be described. Moreover, the machine learning device 200 detects whether a selected edge of a search range is not appropriate during or after learning, and if the selected edge is not appropriate, changes the search range to a new search range and performs learning (this learning will be referred to as relearning). A machining shape designated by the learning machining program is an octagon or a shape in which the corners of an octagon are alternately replaced with arcs, for example. Here, the machining shape designated by the learning machining program is not limited to these machining shapes but may be other machining shapes.

Figure 2:
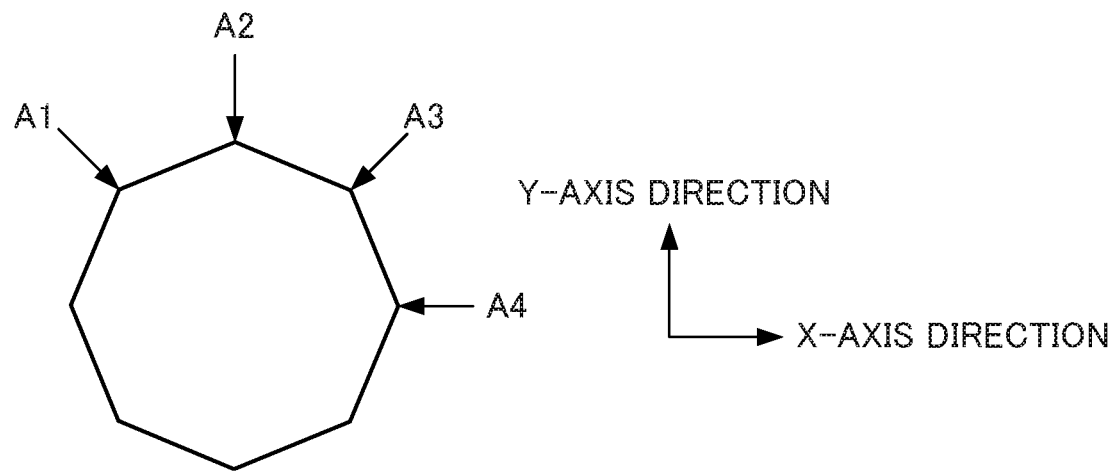
FIG. 2 is a diagram for describing an operation of a servo motor when a machining shape is an octagon.
Figure 3:
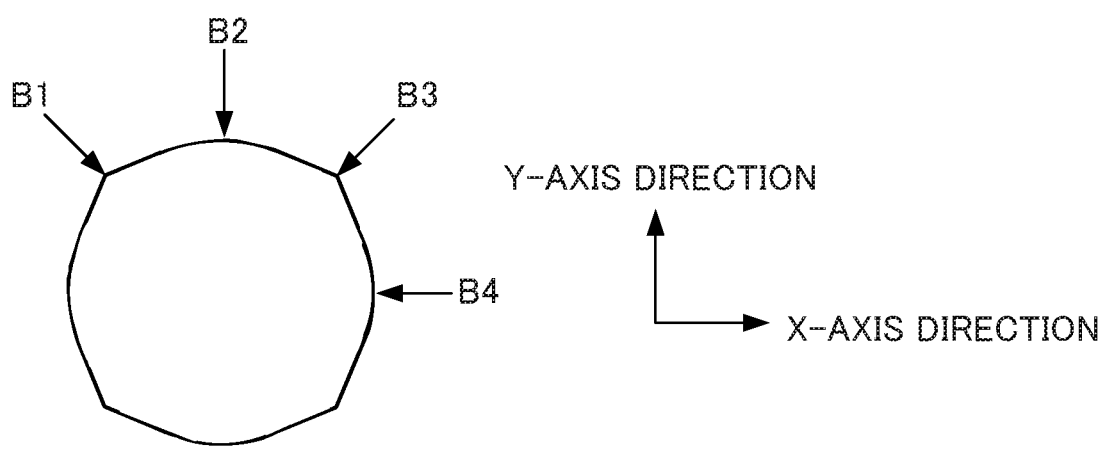
FIG. 3 is a diagram for describing an operation of a motor when a machining shape is a shape in which the corners of an octagon are alternately replaced with arcs.

FIG. 2 is a diagram for describing an operation of a motor when a machining shape is an octagon. FIG. 3 is a diagram for describing an operation of a motor when a machining shape is a shape in which the corners of an octagon are alternately replaced with arcs. In FIGS. 2 and 3, it is assumed that a table is moved in the X and Y-axis directions so that a workpiece (a work) is machined in the clockwise direction.

When the machining shape is an octagon, as illustrated in FIG. 2, the rotation speed of a motor that moves the table in the Y-axis direction decreases at the corner position A1 whereas the rotation speed of a motor that moves the table in the X-axis direction increases. A rotation direction of the motor that moves the table in the Y-axis direction is reversed at the corner position A2, and the motor that moves the table in the X-axis direction rotates at an equal velocity in the same rotation direction from the position A1 to the position A2 and from the position A2 to the position A3. The rotation speed of the motor that moves the table in the Y-axis direction increases at the corner position A3 whereas the rotation speed of a motor that moves the table in the X-axis direction decreases. A rotation direction f the motor that moves the table in the X-axis direction is reversed at the corner position A4, and the motor that moves the table in the Y-axis direction rotates at an equal velocity in the same rotation direction from the position A3 to the position A4 and from the position A4 to the next corner position.

When the machining shape is a shape in which the corners of an octagon are alternately replaced with arcs, as illustrated in FIG. 3, the rotation speed of a motor that moves the table in the Y-axis direction decreases at the corner position B1 whereas the rotation speed of a motor that moves the table in the X-axis direction increases. A rotation direction of the motor that moves the table in the Y-axis direction is reversed at the corner position B2, and the motor that moves the table in the X-axis direction rotates at an equal velocity in the same rotation direction from the position B1 to the position B3. Unlike the case in which the machining shape is an octagon illustrated in FIG. 3, the rotation speed of the motor that moves the table in the Y-axis direction decreases gradually as it approaches the position B2, the rotation stops at the position B2, and the rotation speed increases gradually as it departs from the position B2 so that a machining shape of an arc is formed before and after the position B2.

The rotation speed of the motor that moves the table in the Y-axis direction increases at the corner position B3 whereas the rotation speed of a motor that moves the table in the X-axis direction decreases. A rotation direction of the motor that moves the table in the X-axis direction is reversed at the corner position B4, and the table moves to be linearly reversed in the X-axis direction. Moreover, the motor that moves the table in the Y-axis direction rotates at an equal velocity in the same rotation direction from the position B3 to the position B4 and from the position B4 to the next corner position. The rotation speed of the motor that moves the table in the X-axis direction decreases gradually as it approaches the position B4, the rotation stops at the position B4, and the rotation speed increases gradually as it departs from the position B4 so that a machining shape of an arc is formed before and after the position B4.

In the present embodiment, it is assumed that machine learning related to optimization of the coefficients r and $\omega_n t_s$ of the transfer function F(z) of the IIR filter of the velocity feedforward unit 108 is performed by evaluating vibration when the rotation-stopping target portion during linear control is changed at the positions A1 and A3 and the positions B1 and B3 of the machining shape designated by the learning machining program described above and examining the influence on the position error. Although not used in the present embodiment, coasting (running by inertia) occurring when a rotation direction is reversed at the positions A2 and A4 and the positions B2 and B4 of the machining shape may be evaluated and the influence of a position error may be examined. The machine learning related to optimization of the coefficients of the transfer function is not particularly limited to the velocity feedforward unit, and can be applied to a position feedforward unit or a current feedforward unit provided when performing current feedforward of a servo control device, for example.

Hereinafter, the machine learning device 200 will be described in further detail. In the following description, although a case in which the machine learning device 200 performs reinforcement learning is described, the learning performed by the machine learning device 200 is not particularly limited to reinforcement learning, but the present invention can be also applied to a case in which the machine learning device 200 performs supervised learning, for example.

Prior to description of respective functional blocks included in the machine learning device 200, first, a basic mechanism of reinforcement learning will be described. An agent (corresponding to the machine learning device 200 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total of rewards obtained in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing a position error, is obtained.

Here, although any learning method may be used as the reinforcement learning, in the description below, Q-learning which is a method of learning a value function Q(S,A) of selecting an action A under a certain state S of the environment will be described as an example. An object of the Q-learning is to select an action A having the highest value function Q(S,A) as an optimal action among actions A that can be taken in a certain state S.

However, at an initial time at which the Q-learning starts, the correct value of the value Q(S,A) is not known at all for a combination of the state S and the action A. Therefore, the agent learns the correct value Q(S,A) by selecting various actions A under a certain state S and making a better selection of action based on rewards given for the selected actions A.

Since the agent wants to maximize the total of rewards obtained over the course of the future, the Q-learning aims to attain a relation of $Q(S,A)=E[\Sigma(\gamma')r_t]$ in the end. Here, E[ ] indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 2 below (indicated as Math. 2 below).

$$Q(S_{t+1}, A_{t+1}) \leftarrow Q(S_t, A_t) + \alpha\left(r_{t+1} + \gamma\max_A Q(S_{t+1}, A) - Q(S_t, A_t)\right) \quad \text{[Math. 2]}$$

In Expression 2, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\leq 1$ and is called a discount rate. Moreover, $\alpha$ is a learning coefficient and is in the range of $0<\alpha\leq 1$.

Expression 2 indicates a method of updating a value $Q(S_t, A_t)$ of an action $A_t$ in a state $S_t$ based on a reward $r_{t+1}$ that was offered in return when the action $A_t$ was performed. This updating expression indicates that if the value $\max_a Q(S_{t+1}, A)$ of the best action in the next state $S_{t+1}$ associated with an action $A_t$ is larger than the value $Q(S_t, A_t)$ of an action $A_t$ in the state St, $Q(S_t, A_t)$ is increased, and if otherwise, $Q(S_t, A_t)$ is decreased. That is, the updating expression brings the value of a certain action in a certain state close to the value of the best action in the next state associated with the action. However, although this difference differs depending on the discount rate $\gamma$ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. The machine learning device 200 performs machine learning (hereinafter referred to as learning) on a value Q of selecting an action A of adjusting the coefficients r and $\omega_n t_s$ of the transfer function F(z) of the IIR filter associated with a state S wherein the state S is a servo state such as commands and feedbacks including the coefficients r and $\omega_n t_s$ of the transfer function F(z) of the IIR filter of the IIR filter unit 1082 of the velocity feedforward unit 108, and the position error information and the position command of the servo control device 100 acquired by executing the machining program during machine learning. The machine learning device 200 searches for a zero-point which is z at which the transfer function F(z) of the IIR filter in Expression 1 is 0. Specifically, the machine learning device 200 according to the embodiment of the present invention learns a radius r and a deflection angle $\omega_n t_s$ that minimize the position error to set the radius r and the coefficients $\omega_n t_s$ of the transfer function F(z) that minimize the position error by searching for and learning, within a predetermined range, the radius r and the deflection angle $\omega_n t_s$ representing a zero-point of the transfer function F(z) of the IIR filter in Expression 1 in polar coordinates as illustrated in FIG. 4.

The machine learning device 200 observes the state information S including a servo state such as commands and feedbacks including the position commands and the position error information of the servo control device 100 at the positions A1 and A3 and the positions B1 and B3 of the machining shape by executing the learning machining program on the basis of the values of the coefficients r and $\omega_n t_s$ of the transfer function F(z) of the IIR filter of the IIR filter unit 1082 to determine the action A. The machine learning device 200 receives a reward whenever the action A is executed. The machine learning device 200 searches in trial-and-error manner for the optimal action A so that the total of the reward over the course of the future is maximized. By doing so, the machine learning device 200 can select an optimal action A (that is, the value of the optimal zero-point of the transfer function F(z) of the IIR filter) with respect to the state S including the servo state such as commands and feedbacks including the position commands and the position error information of the servo control device 100 acquired by executing the learning machining program on the basis of the values of the coefficients calculated on the basis of the value of the zero-point of the transfer function F(z) of the IIR filter. The rotation direction of the servo motor in the X-axis direction and the Y-axis direction does not change at the positions A1 and A3 and the positions B1 and B3, and the machine learning device 200 can learn the zero-point of the transfer function F(z) of the IIR filter during linear operation.

That is, it is possible to select an action A (that is, the value of the zero-point of the transfer function F(z) of the IIR filter) that minimizes the position error acquired by executing the learning machining program by selecting an action A that maximizes the value of Q from among the actions A applied to the transfer function F(z) of the IIR filter associated with a certain state S on the basis of the value function Q learned by the machine learning device 200.

Figure 4:
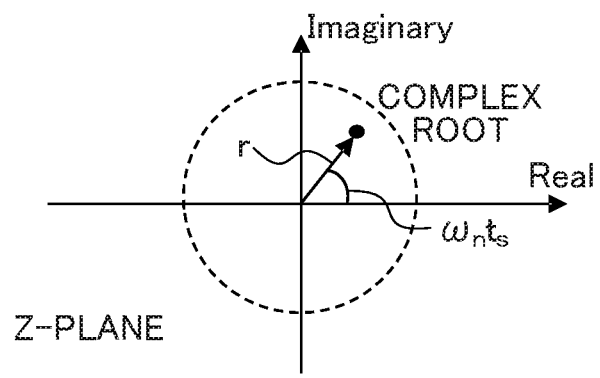
FIG. 4 is a diagram illustrating a radius r and a deflection angle $\omega_n t_s$ representing a zero-point of a transfer function of an IIR filter in a polar coordinate.

The search ranges of the zero-point is set by defining the radius r in the range of $0 \leq r \leq 1$, for example, for example, in a complex plane in FIG. 4 and defining the deflection angle $\omega_n t_s$ in a responsible frequency range of a velocity loop. When a solution (zero-point) of the numerator of the transfer function F(z) of the IIR filter is a complex root $z = re^{\pm j\omega_n t_s}$, (deflection angle)/$t_s = \omega_n$ represents a concurrent fault [rad/s]. When a central frequency is $f_n$, the central angular frequency of attenuation $\omega_n$ is represented by $\omega_n = 2\pi f_n$. For example, when the central angular frequency of attenuation $\omega_n$ is $100 \cdot 2\pi \leq \omega_n \leq 500 \cdot 2\pi$, the frequency of the search range is 100 Hz to 500 Hz. When $t_s = 0.0005$ [sec], the range of deflection angle is $0.05 \cdot 2\pi \leq \omega_n t_s \leq 0.25 \cdot 2\pi$. In the complex plane of FIG. 4, a fan-shaped range of 18° to 90° is the search range.

When a zero-point is searched for in a polar coordinate, first, the radius r is fixed to an arbitrary value in the range of ($0 \leq r \leq 1$), and the deflection angle $\omega_n t_s$ in the fan-shaped search range of 18° to 90° is set in a trial-and-error manner to thereby set the coefficients $(-re^{j\omega_n t_s} - re^{-j\omega_n t_s})$ and r such that $z = re^{j\omega_n t_s}$ and the conjugate complex number thereof $z^* = re^{-j\omega_n t_s}$ are the zero-point of $(z^2 + r(-re^{j\omega_n t_s} - re^{-j\omega_n t_s})z + r^2)$. The initial setting value of the deflection angle $\omega_n t_s$ is set in the fan-shaped search range of 18° to 90°.

The machine learning device 200 transmits the adjustment information of the obtained coefficients r and $\omega_n t_s$ to the IIR filter unit 1082 as the action A and sets the coefficients r and $\omega_n t_s$ in the numerator of the transfer function F(z) of the IIR filter. When such an ideal deflection angle $\omega_{n0} t_s$ that maximizes the value of the value function Q by the machine learning device 200 performing learning to search for the deflection angle $\omega_n t_s$ is determined, the deflection angle $\omega_n t_s$ is fixed to the deflection angle $\omega_{n0} t_s$ and the radius r is varied to thereby set the coefficients r and $\omega_n t_s$ in the numerator of the transfer function F(z) of the IIR filter. By the learning of searching for the radius r, such an optimal radius $r_0$ that maximizes the value of the value function Q is determined.

Figure 5:
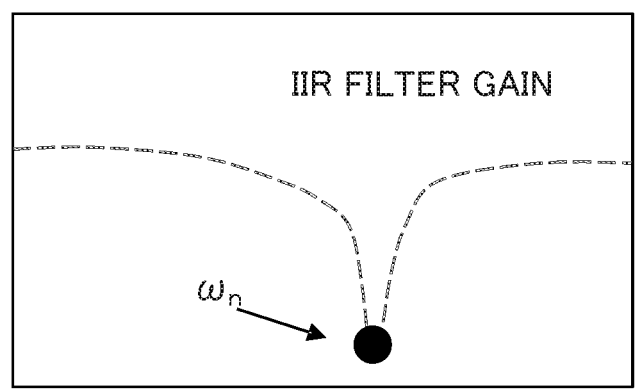
FIG. 5 is a diagram illustrating an example of a filter gain of an IIR filter of which the coefficients are optimized.

In this manner, by searching for and learning, within a predetermined range, the radius r and the deflection angle $\omega_n t_s$ which represent the zero-point of the transfer function F(z) of the IIR filter in polar coordinates so that the position error is minimized, it is possible to perform optimization of the coefficients r and $\omega_n t_s$ of the transfer function F(z). FIG. 5 illustrates an example of a filter gain of an IIR filter of which the coefficients are optimized. Although the radius r and the deflection angle $\omega_n t_s$ can be learned simultaneously, it is possible to reduce the amount of machine learning and shorten the settling time of machine learning when these coefficients are learned separately.

Figure 6:
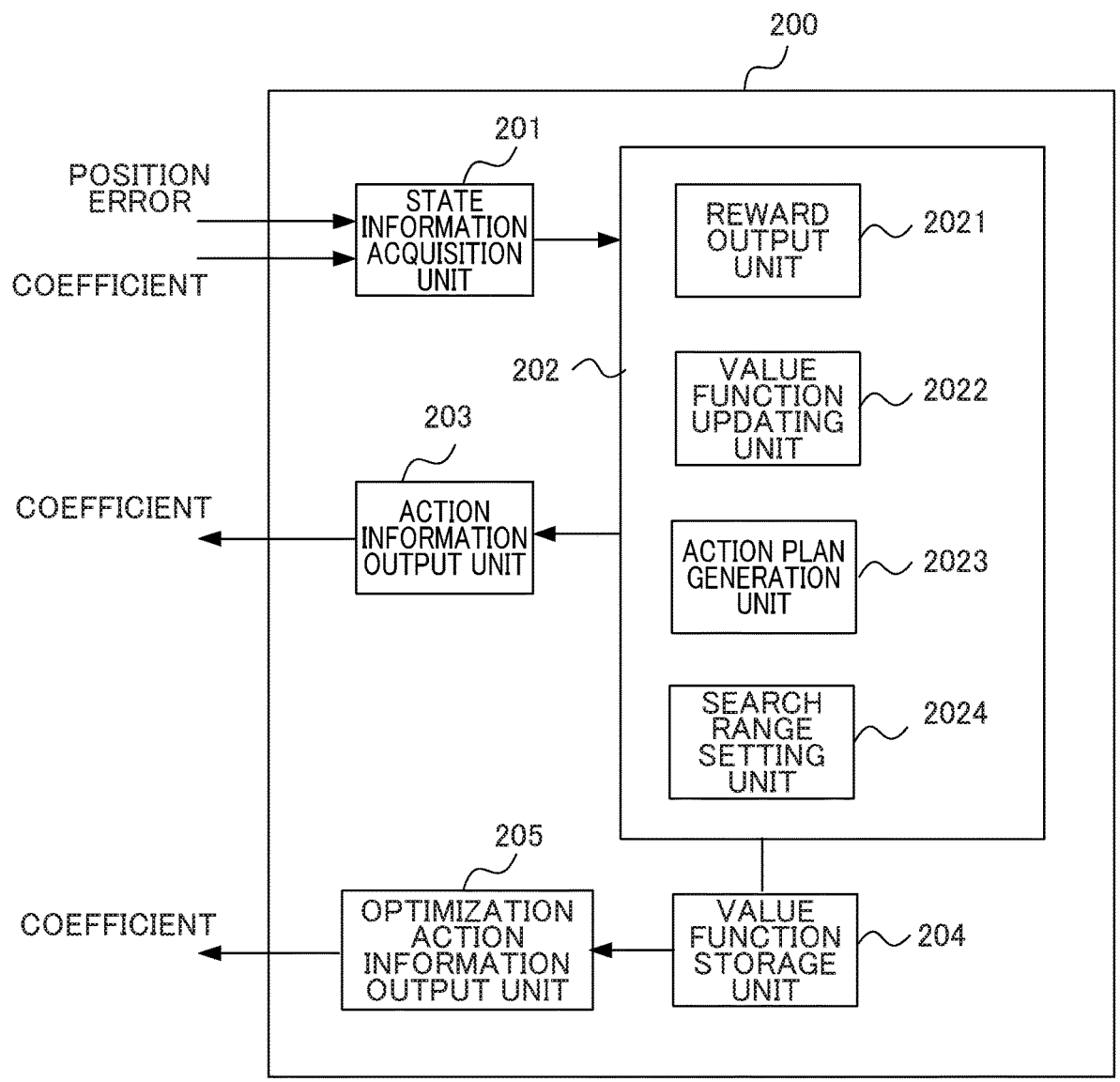
FIG. 6 is a block diagram illustrating a machine learning device 200 according to a first embodiment of the present disclosure.

FIG. 6 is a block diagram illustrating the machine learning device 200 according to the first embodiment of the present disclosure. As illustrated in FIG. 6, in order to perform the reinforcement learning described above, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, an action information generation unit 2023, and a search range setting unit 2024. The search range setting unit 2024 is used for relearning and the detailed description will be provided later.

The state information acquisition unit 201 acquires, from the servo control device 100, the state S including a servo state such as commands and feedbacks including the position commands and the position error information of the servo control device 100 acquired by executing the learning machining program on the basis of the values of the coefficients r and $\omega_n t_s$ of the transfer function F(z) of the IIR filter of the IIR filter unit 1082 the velocity feedforward unit 108 of the servo control device 100. The state information S corresponds to a state S of the environment in the Q-learning. The state information acquisition unit 201 outputs the acquired state information S to the learning unit 202.

The initial setting values of the transfer function F(z) of the IIR filter at a time point at which the Q-learning starts initially are set by a user in advance. In the present embodiment, after that, the coefficients r and $\omega_n t_s$ of the transfer function F(z) of the IIR filter set initially by the user are adjusted to optimal values by reinforcement learning of searching for the radius r and the deflection angle $\omega_n t_s$ which represent the zero-point in polar coordinates within a predetermined range as described above. The coefficient β of the IIR filter unit 1082 is set to a fixed value such as β=1, for example. Moreover, as for the initial setting values of the coefficients r and $\omega_n t_s$ in the numerator of the transfer function F(z), the radius r can be set to a value within the range of $0 \leq r \leq 1$, and the deflection angle $\omega_n t_s$ can be set to a value within the predetermined search range. Furthermore, as for the coefficients r and $\omega_n t_s$, when an operator adjusts the machine tool in advance, machine learning may be performed using the values of the coefficients r and $\omega_n t_s$ of the adjusted transfer function as initial values.

The learning unit 202 is a unit that learns the value function Q(S,A) when a certain action A is selected under a certain state S of the environment. The action A is correction information of the coefficients r and $\omega_n t_s$ in the numerator of the transfer function F(z) of the IIR filter, for example.

The reward output unit 2021 is a unit that calculates a reward when the action A is selected under a certain state S. Here, a set (a position error set) of position errors which are state variables of the state S will be denoted by PD(S), and a position error set which is state variables related to state information S' which is changed from the state S due to the action information A will be denoted by PD(S'). Moreover, the position error value in the state S is a value calculated based on a predetermined evaluation function f(PD(S)).

Functions can be used as the evaluation function f includes:

A function that calculates an integrated value of an absolute value of a position error $\int |e| dt$ A function that calculates an integrated value by a weighting an absolute value of a position error with time $\int t |e| dt$ A function that calculates an integrated value of a 2n-th power (n is a natural number) of an absolute value of a position error $\int e^{2n} dt$ (n is a natural number)

A function that calculates a maximum value of an absolute value of a position error Max{|e|}.

In this case, the reward output unit 2021 sets the value of a reward to a negative value when the evaluation function value f(PD(S')) of the position error of the servo control device 100 operated on the basis of the velocity feedforward unit 108 after the correction related to the state information S' corrected by the action information A is larger than the evaluation function value f(PD(S)) of the position error of the servo control device 100 operated on the basis of the velocity feedforward unit 108 before the correction related to the state information S before being corrected by the action information A.

On the other hand, the reward output unit 2021 sets the value of the reward to a positive value when the evaluation function value f(PD(S')) of the position error is smaller than the evaluation function value f(PD(S)) of the position error. The reward output unit 2021 sets the value of the reward to zero when the evaluation function value f(PD(S')) of the position error is equal to the evaluation function value f(PD(S)) of the position error.

Furthermore, the negative value when the evaluation function value f(PD(S')) of the position error in the state S' after execution of the action A is larger than the evaluation function value f(PD(S)) of the position error in the previous state S may increase according to a proportion. That is, the negative value may increase according to the degree of increase in the evaluation function value of the position error. In contrast, the positive value when the evaluation function value f(PD(S')) of the position error in the state S' after execution of the action A is smaller than the evaluation function value f(PD(S)) of the position error in the previous state S may increase according to a proportion. That is, the positive value may increase according to the degree of decrease in the value of the position error.

The value function updating unit 2022 updates the value function Q stored in the value function storage unit 204 by performing Q-learning based on the state S, the action A, the state S' when the action A was applied to the state S, and the value of the reward calculated in the above-mentioned manner. The updating of the value function Q may be performed by online learning, batch learning, or mini-batch learning.

The action information generation unit 3023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients r and $\omega_n t_s$ of the transfer function F(z) of the IIR filter of the IIR filter unit 1082 of the servo control device 100 in the process of Q-learning. More specifically, the action information generation unit 2023 increases or decreases the deflection angle $\omega_n t_s$ received from the state information acquisition unit 201 within the search range in a state in which the zero-point of z in the numerator $(z^2+r(-re^{j\omega n t_s}-re^{j\omega n t_s})z+r^2)$ of the transfer function F(z) of the IIR filter is set as $re^{ij\omega n t_s}$ and the radius r received from the state information acquisition unit 201 is fixed in order to search for the zero-point in polar coordinates, for example. Moreover, z serving as the zero-point and the conjugate complex number thereof z* are set with the aid of the fixed radius z and the increased or decreased deflection angle $\omega_n t_s$, and a new coefficient $\omega_n t_s$ is calculated on the basis of the zero-point.

When the state S transitions to the state S' by increasing or decreasing the deflection angle $\omega_n t_s$ and newly setting the coefficient $\omega_n t_s$ of the transfer function F(z) of the IIR filter, and a plus reward (a positive reward) is offered in return, the action information generation unit 2023 may select a policy of selecting such an action A' that further decreases the value of the position error such as increasing or decreasing the deflection angle $\omega_n t_s$ similarly to the previous action as the next action A'.

In contrast, when a minus reward (a negative reward) is returned, the action information generation unit 2023 may select a policy of selecting such an action A' that decreases the position error to be smaller than the previous value such as decreasing or increasing the deflection angle $\omega_n t_s$ contrarily to the previous action as the next action A', for example.

When searching of the deflection angle $\omega_n t_s$ is continued and an ideal deflection angle $\omega_{n0} t_s$ that maximizes the value of the value function Q is determined by learning with the aid of optimization action information (to be described later) from the optimization action information output unit 205, the action plan generation unit 2023 fixes the deflection angle $\omega_n t_s$ to the deflection angle $\omega_{n0} t_s$ to search for the radius r within the range of 0≤r≤1 and sets the coefficient in the numerator of the transfer function F(z) of the IIR filter similarly to the searching of the deflection angle $\omega_n t_s$. When searching of the radius r is continued and an ideal radius $r_0$ that maximizes the value of the value function Q is determined by learning with the aid of the optimization action information (to be described later) from the optimization action information output unit 205, the action plan generation unit 2023 determines the optimal coefficient $r_0$ in the numerator.

The action information output unit 203 is a unit that transmits the action information A output from the learning unit 202 to the servo control device 100. As described above, the servo control device 100 finely corrects the present state S (that is, the presently set radius r and deflection angle $\omega_n t_s$ which represent the zero-point of the transfer function F(z) of the IIR filter in polar coordinates) on the basis of the action information to thereby transition to the next state S' (that is, the coefficients r and $\omega_n t_s$ of the transfer function F(z) of the IIR filter corresponding to the corrected zero-point).

The value function storage unit 204 is a storage device that stores the value function Q. The value function Q may be stored as a table (hereinafter referred to as an action value table) for each state S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in distributed manner in the respective machine learning devices 200, it is possible to improve the reinforcement learning efficiency.

The optimization action information output unit 205 generates the action information A (hereinafter referred to as "optimization action information") which causes the velocity feedforward unit 108 to perform an operation of maximizing the value function Q(S,A) on the basis of the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information on the basis of the value function Q and outputs the generated action information to the servo control device 100 (the IIR filter unit 1082 of the velocity feedforward unit 108). The optimization action information includes information that corrects the coefficients of the transfer function F(z) of the IIR filter by learning the deflection angle $\omega_n t_s$ and the radius r similarly to the action information that the action information output unit 203 outputs in the process of Q-learning.

In the servo control device 100, the coefficients of the transfer function related to the numerator of the transfer function F(z) of the IIR filter are corrected on the basis of the action information which is based on the deflection angle $\omega_n t_s$ and the radius r.

The above description is applied to a case in which the pole of the transfer function F(z) of the IIR filter is searched for. In this case, when $z=re^{-i\omega_n t_s}$ and the conjugate complex number thereof $z^*=re^{-i\omega_n t_s}$ in the denominator ($z^2+a_1+a_0$) of the transfer function F(z) are the pole (the deflection angle $\omega_n t_s$ is within a predetermined range of $0 \le r \le 1$), the optimal radius r and deflection angle $\omega_n t_s$ are calculated similarly to the searching of the zero-point by setting the coefficient $a_1$ of the transfer function F(z) as $-re^{i\omega_n t_s}-re^{\omega_n t_s}$ and the coefficient $a_0$ as $r^2$, and this is converted to learn the values of the coefficients $a_1$ and $a_0$.

In the present embodiment, the reward output unit 2021 calculated the reward value by comparing the evaluation function value f(PD(S)) of the position error in the state S calculated on the basis of the predetermined evaluation function f(PD(S)) using the position error PD(S) in the state S as an input with the evaluation function value f(PD(S')) of the position error in the state S' calculated on the basis of the evaluation function f(PD(S')) using the position error PD(S') in the state S' as an input. However, the reward output unit 2021 may add another element other than the position error when calculating the reward value. For example, the machine learning device 200 may add at least one of a position-feedforward-controlled velocity command output from the adder 103, a difference between a velocity feedback and a position-feedforward-controlled velocity command, and a position-feedforward-controlled torque command output from the adder 106 in addition to the position error output from the subtractor 101.

<Relearning>

Figure 7:
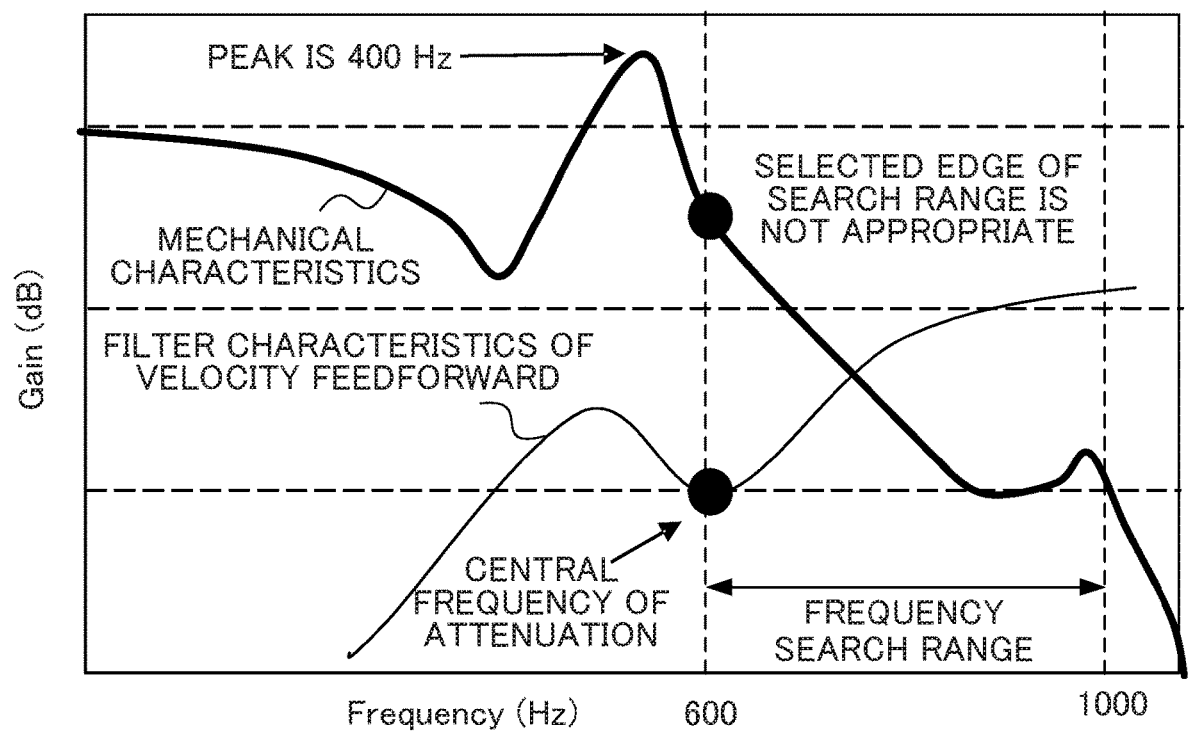
FIG. 7 is a characteristic diagram illustrating mechanical characteristics and IIR filter characteristics of velocity feedforward at a frequency including a present search range.

While learning of the machine learning device 200 has been described, a configuration and an operation of the machine learning device 200 which detects whether a selected edge of a search range is appropriate during or after learning, and changes the search range to a new search range to perform learning (relearning) if the selected edge is not appropriate will be described. In learning of the machine learning device 200, when the search range of the deflection angle $\omega_n t_s$ of velocity feedforward is not appropriate, a central frequency of attenuation ($\omega_n/2\pi$) of a search solution of the IIR filter of the velocity feedforward unit 1082 obtained by learning may not match a peak frequency of mechanical characteristics. Here, a search solution refers to a parameter (in this example, the central frequency of attenuation ($\omega_n/2\pi n$)) at which a smallest evaluation function value can be obtained in a search range. Although a search range is illustrated by a central frequency of attenuation in FIG. 7, the search range may be illustrated by a deflection angle $\omega_n t_s$ or a central angular frequency of attenuation. The deflection angle $\omega_n t_s$ corresponds to the coefficient $\omega_n t_s$ of the transfer function F(z) of the IIR filter of the velocity feedforward unit 108 and is a first process. The central frequency of attenuation ($\omega_n/2\pi$) or the central angular frequency of attenuation $\omega_n$ is a second parameter used for searching for the first parameter ($\omega_n t_s$). For example, when the search range of the central angular frequency of attenuation $\omega_n$ is $600\cdot 2\pi \le \omega_n \le 100\cdot 2\pi$, although the central frequency of attenuation ($\omega_n/2\pi$) is 600 Hz to 1000 Hz, 600 Hz which is the lower end is selected as an optimal search solution of the central frequency of attenuation ($\omega_n/2\pi$) if the frequency is 600 Hz to 1000 Hz. However, the peak frequency of mechanical characteristics is 400 Hz which does not match the frequency of 600 Hz of the search solution of the central frequency of attenuation.

In the present embodiment, when the peak frequency of mechanical characteristics does not match the frequency of the search solution of the central frequency of attenuation ($\omega_n/2\pi$), the search range setting unit 2024 illustrated in FIG. 6 performs an operation of changing the search range so that the search solution of the central frequency of attenuation ($\omega_n/2\pi$) matches or approaches the peak of mechanical characteristics. Here, changing the search range includes extending an edge of a search range set presently, setting a search range so as to overlap a portion of a search range set presently, and setting a search range to another range different from a search range set presently.

Figure 8:
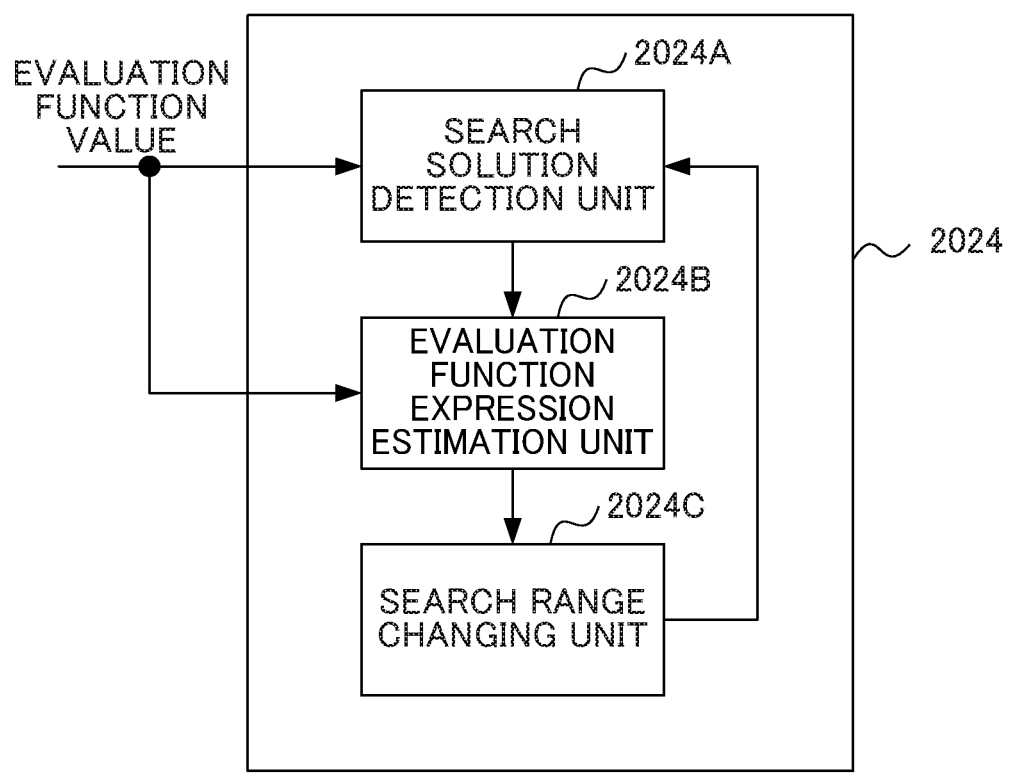
FIG. 8 is a block diagram illustrating a configuration example of a search range setting unit.
Figure 9:
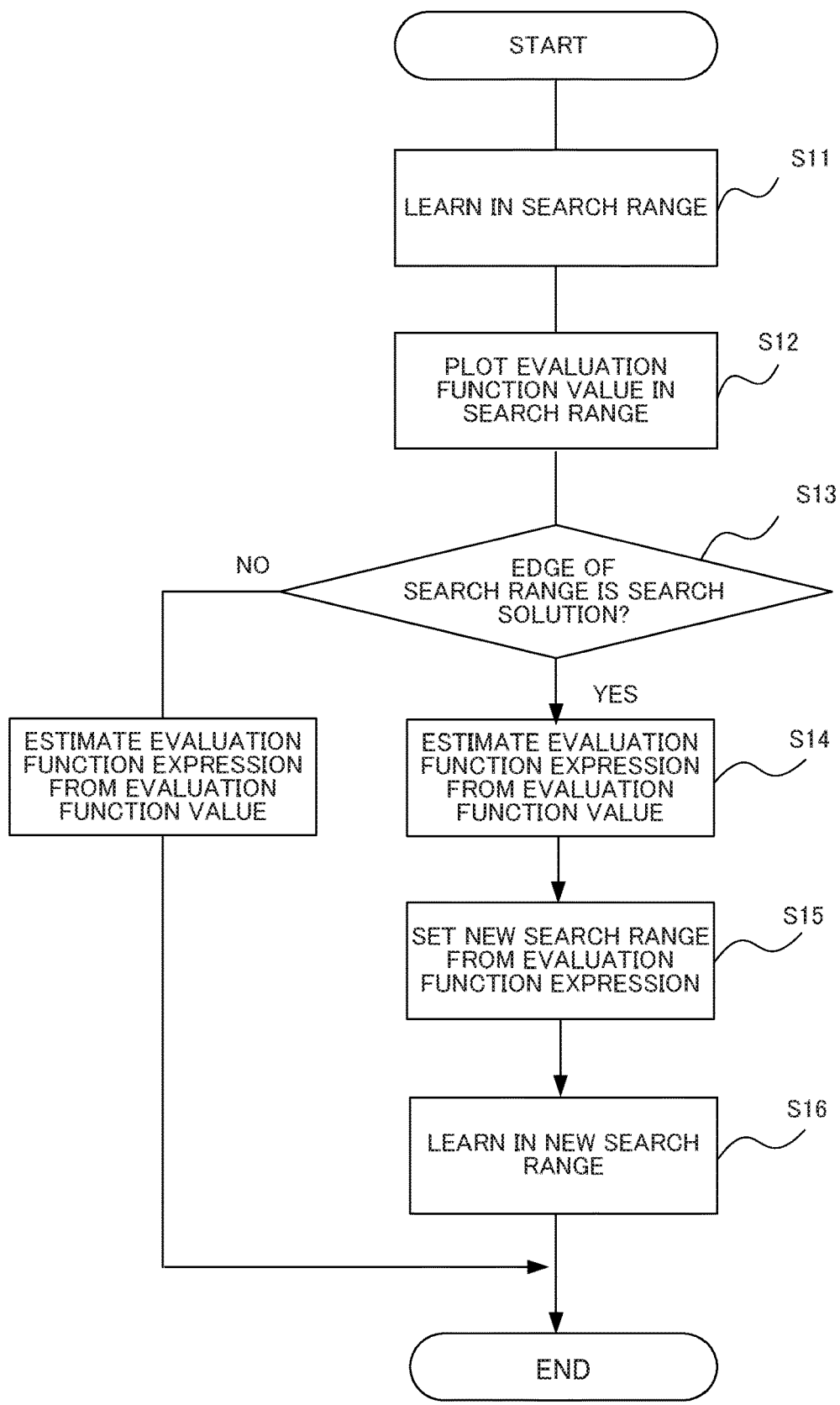
FIG. 9 is a flowchart illustrating an operation of a machine learning device, mainly or a search range setting unit.

FIG. 8 is a block diagram illustrating a configuration example of a search range setting unit. FIG. 9 is a flowchart illustrating an operation of a machine learning device, mainly of a search range setting unit. The operation illustrated in FIG. 9 is performed during or after learning of the machine learning device 200. As illustrated in FIG. 8, the search range setting unit 2024 includes a search solution detection unit 2024A, an evaluation function expression estimation unit 2024B, and a search range changing unit 2024C.

In step S11 illustrated in FIG. 9, the machine learning device 200 illustrated in FIG. 6 excluding the search range setting unit 2024 performs learning using the set frequency of 600 Hz to 1000 Hz as a search range R1.

Figure 10:
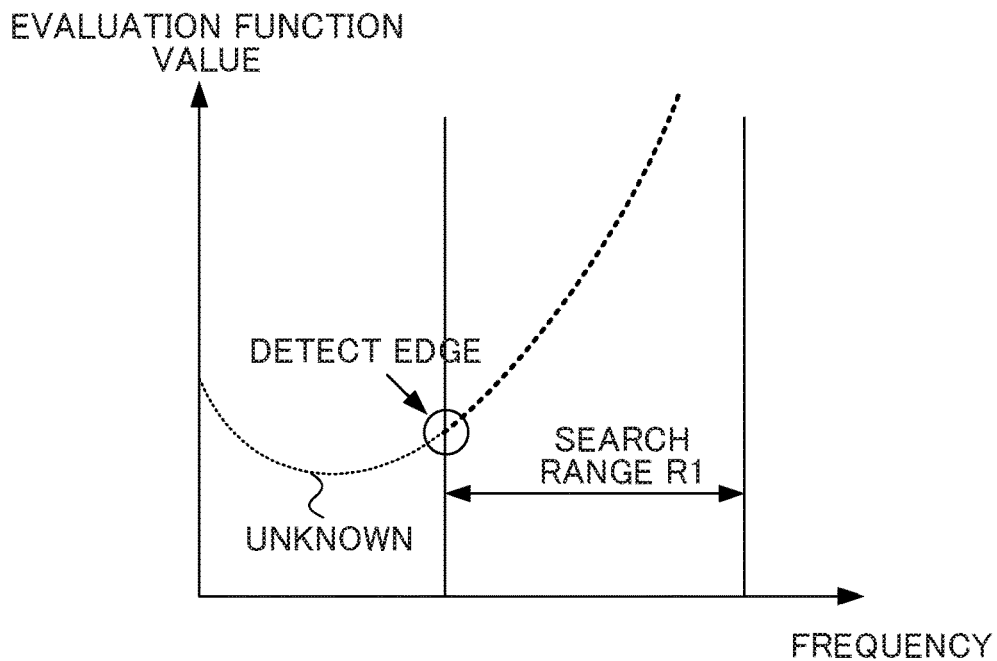
FIG. 10 is a characteristic diagram of an evaluation function value and a frequency including a search range set presently.

In step S12, the search solution detection unit 2024A acquires a set of evaluation function values calculated by the reward output unit 2021 and plots the set of evaluation function values in the search range R1 set presently as illustrated in FIG. 10.

In step S13, the search solution detection unit 2024A detects whether an edge of the search range R1 is a search solution of the evaluation function value from the plotted curve of the evaluation function value. The search solution detection unit 2024A transmits a detection signal to the evaluation function expression estimation unit 2024B when it is detected that an edge of the search range R1 is a search solution (S13: YES). In FIG. 10, the curve of the evaluation function value plotted in the search range R1 declines leftward, and there is a possibility that the evaluation function value decreases exceeding the edge of the search range R1. In FIG. 10, the curve of an evaluation function value exceeding the edge of the search range R1 is illustrated as an unknown range. In step S13, when the search solution detection unit 2024A has not detected that the edge of the search range R1 is a search solution (S13: NO), the process ends.

Figure 11:
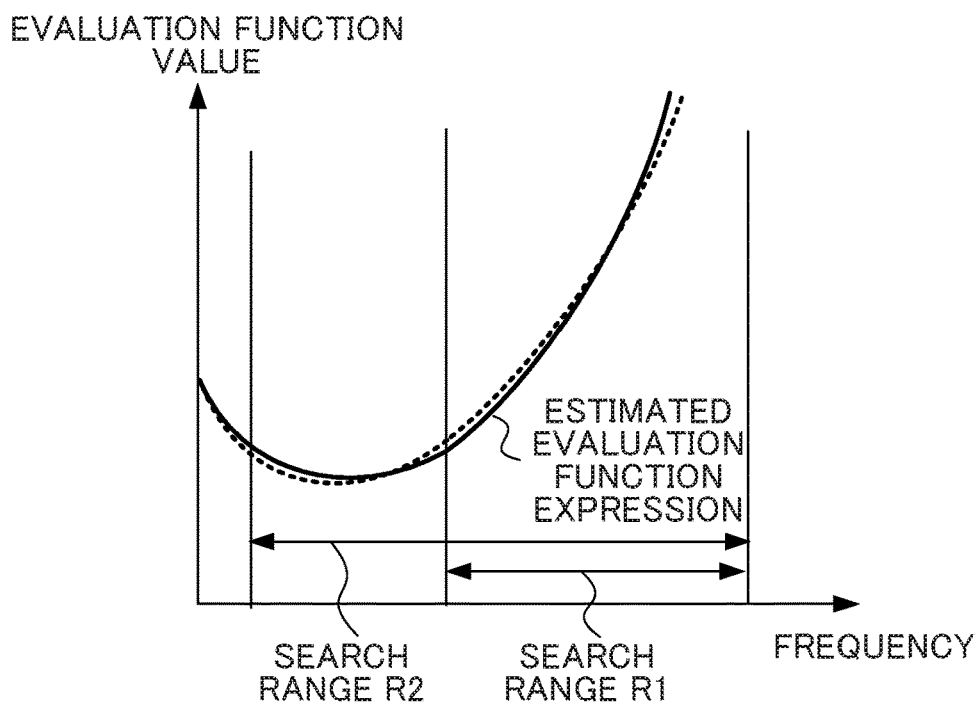
FIG. 11 is a characteristic diagram illustrating an evaluation function expression and a relationship between an evaluation function value and frequencies indicating a search range set presently and a search range set newly.

In step S14, upon receiving the detection signal, the evaluation function expression estimation unit 2024B estimates an evaluation function expression of a frequency from an evaluation function expression model on the basis of the evaluation function value obtained within the search range R1. FIG. 11 illustrates a case where the estimated evaluation function expression is a quadratic function. An evaluation function model is a polynomial expression, and in the distribution of the evaluation function value in FIG. 10, an evaluation function model of $A\omega^2+B\omega+C$ can be used, for example. Here, $\omega$ indicates a central frequency of attenuation of a filter, and A, B, and C indicate the coefficients of a quadratic function expression.

Figure 12:
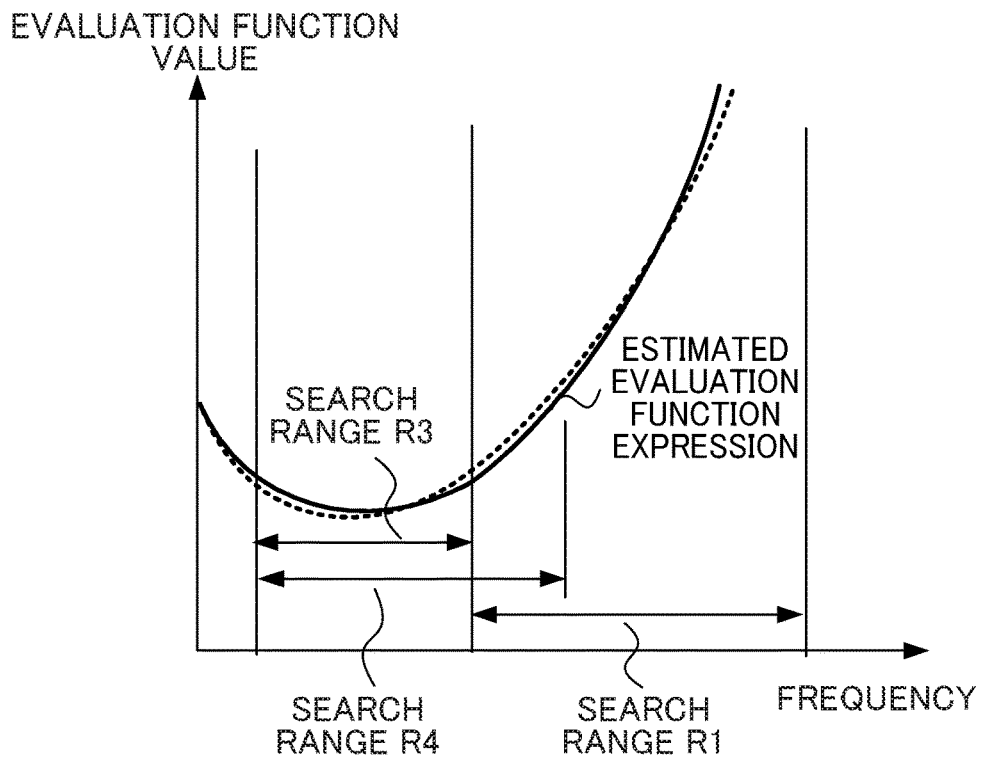
FIG. 12 is a characteristic diagram illustrating an evaluation function expression and a relationship between an evaluation function value and frequencies indicating a search range set presently and another search range set newly.

In step S15, the search range changing unit 2024C determines a new search range and the number of searches from the shape of the estimated evaluation function expression. In FIG. 11, the search range R1 set presently is extended to set a new search range R2. As illustrated in FIG. 12, another new search range R3 different from the search range R1 set present may be set, and a new search range R4 may be set so as to overlap the search range R1 set presently. When the new search range R4 or the search range R3 is set, and the estimated evaluation function expression is a quadratic function, a range of ±Δx about a minimum value may be set as a search range. The search range changing unit 2024C transmits the search range set newly to the search solution detection unit 2024A.

Figure 13:
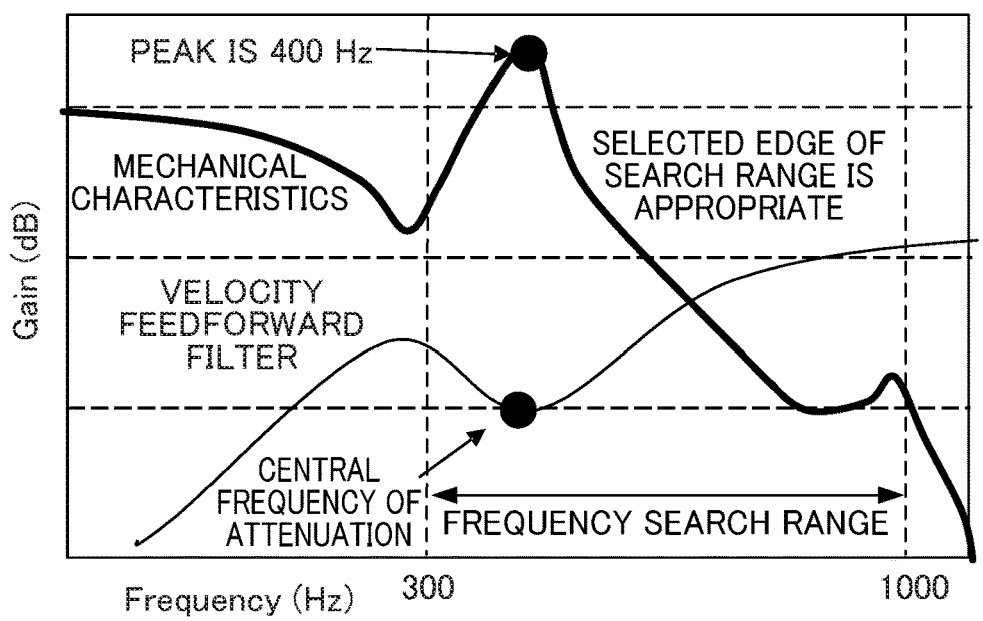
FIG. 13 is a characteristic diagram illustrating mechanical characteristics and IIR filter characteristics of velocity feedforward at a frequency including a search range set newly.

In step S16, the machine learning device 200 excluding the search range setting unit 2024 performs learning in the search range set newly. The operations of steps S11 to S16 are repeated so that the peak frequency of mechanical characteristics matches or approaches the frequency of the search solution of the central frequency of attenuation $\omega_n/2\pi$ as necessary. With the above-described operations, it is possible to change the search range so that an appropriate search range is obtained. FIG. 13 illustrates a result when the search range frequency of 600 Hz to 1000 Hz set presently is extended to a search range of 300 Hz to 1000 Hz. As illustrated in FIG. 13, the search range can be set so that the peak frequency of mechanical characteristics matches the frequency of the search solution of the central angular frequency of attenuation $\omega_n$. In the above description, although the search range of the central frequency of attenuation ($\omega_n/2\pi$) is defined, the search range may be defined by the central angular frequency of attenuation ($\omega_n$) or the deflection angle ($\omega_n t_s$).

Figure 14:
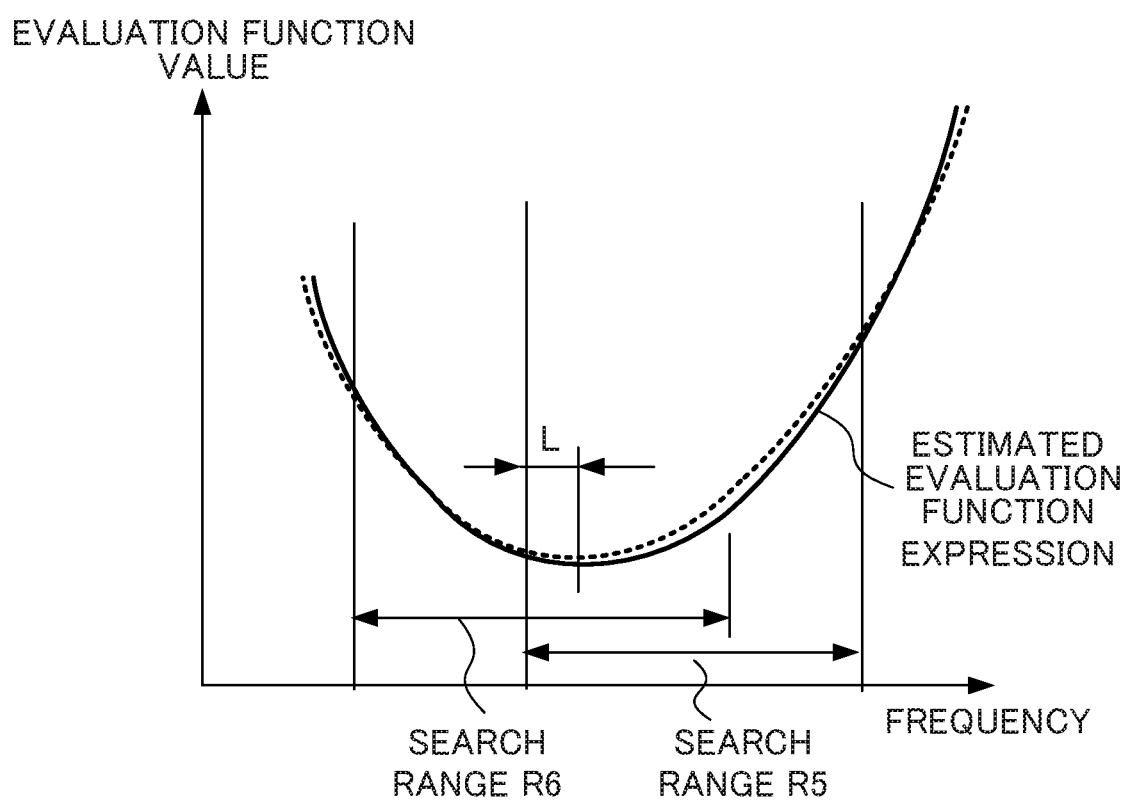
FIG. 14 is a characteristic diagram illustrating an evaluation function expression and a relationship between an evaluation function value and frequencies indicating a search range set presently and another search, range set newly in another configuration example.

In the above description, although a new search range is set depending on whether the edge of the resource R1 is a search solution, an operation of changing the search range as illustrated in FIG. 9 may be performed depending on whether a search solution is within a range separated by a width of L from the edge of a present search range R5 as illustrated in FIG. 14. In this case, in step S13 of FIG. 9, the search solution detection unit 2024A detects whether a search solution is within a range separated by a width (a predetermined range) of L from the edge of the search range R5 from the plotted curve of the evaluation function value. When the search solution is in the range separated by the width of L from the edge of the search range R5, it is possible to set a search range R6 including the search solution as illustrated in FIG. 14, for example. According to this operation, it is possible to set a search range on the basis of the frequency of the search solution within the present search range R5 and to detect the search solution even when another search solution having a low evaluation function value is outside the present search range R5. The above-described operation is also applied to a case where the search range of the radius r of velocity feedforward is not appropriate. In this case, the radius r corresponds to the coefficient r of the transfer function F(z) of the IIR filter of the velocity feedforward unit 108 and serves as a first parameter.

As described above, by using the machine learning device 200 according to the present embodiment, it is possible to simplify the adjustment of the parameters of the velocity feedforward unit 108 of the servo control device 100. Moreover, with the aid of the search range setting unit, it is possible to change the search range so that an appropriate search range is obtained even when the search range is not an appropriate range.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and deploys the read application software and OS in the main storage device to perform arithmetic processing based on the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high velocity processing can be performed. Furthermore, in order to perform faster processing, the machine learning device 200 may construct a computer cluster using a plurality of computers equipped with such GPUs and may perform parallel, processing with the plurality of computers included in the computer cluster.

Second Embodiment

Figure 15:
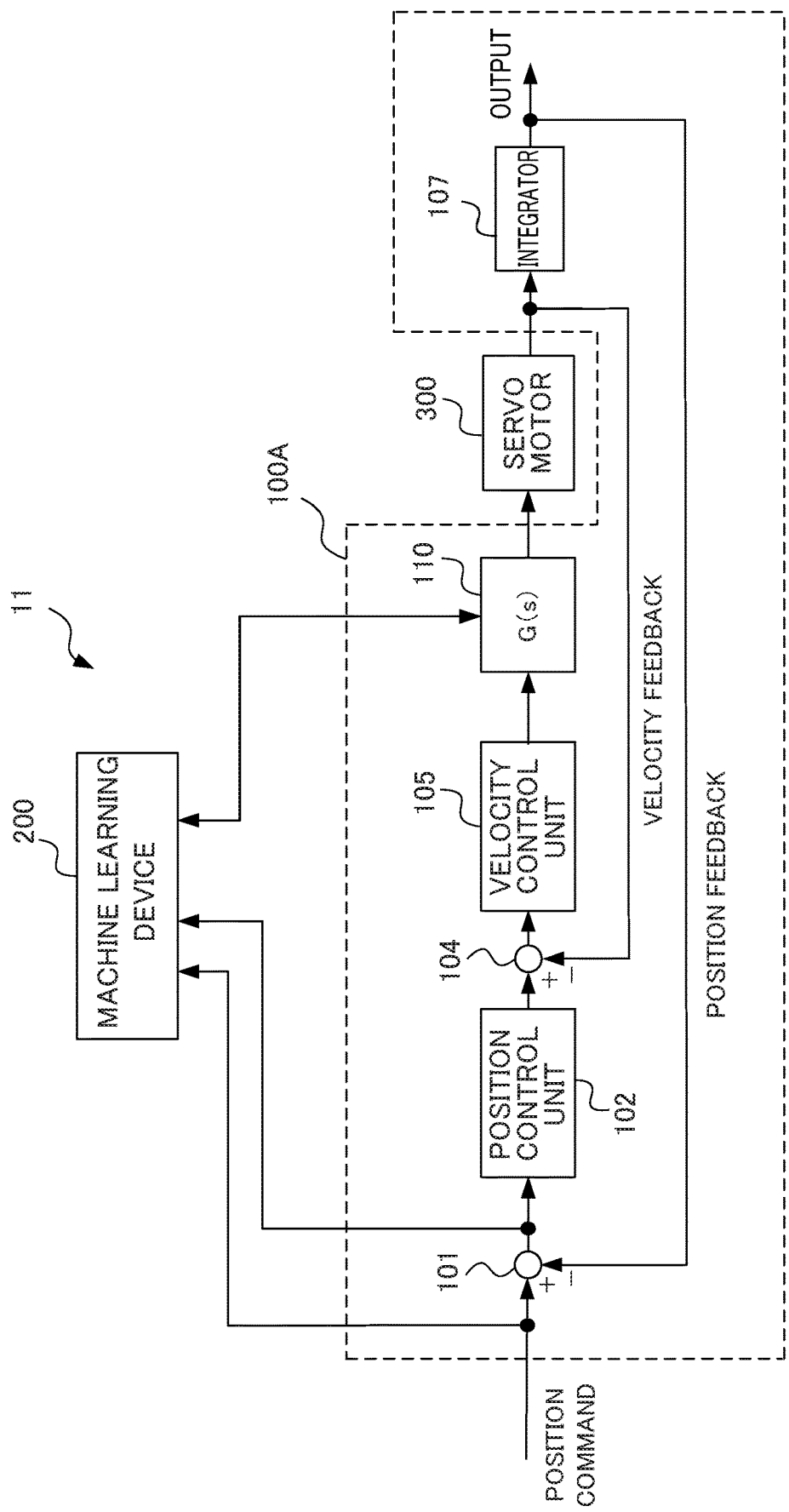
FIG. 15 is a block diagram illustrating a configuration example of a control device according to a second embodiment of the present disclosure.

FIG. 15 is a block diagram illustrating a configuration example of a control device according to a second embodiment of the present invention. A control device 11 illustrated in FIG. 15 includes a servo control device 100A and a machine learning device 200. In FIG. 15, the components which are the same as the components illustrated in FIG. 1 will be denoted by the same reference numerals, and the description thereof will be omitted. The servo control device 100A of the present embodiment illustrated in FIG. 15 is different from the servo control device 100 illustrated in FIG. 1 in that the adder 103, the adder 106, the velocity feedforward unit 108, and the position feedforward unit 109 are not provided, and a filter 110 is provided between the velocity control unit 105 and the servo motor 300. The machine learning device 200 has the same configuration and performs the same operation as those of the machine learning device of the first embodiment described with reference to FIG. 6 to 14 except that the state information and the action information are different from that of the machine learning device of the first embodiment due to a difference in configuration of the servo control device and the operation based on the difference in the state information and the action information is different from that of the machine learning device of the first embodiment. Hereinafter, the configuration and the operation of the servo control device and the operation of the machine learning device different from those of the first embodiment will be described.

The filter 110 of the servo control device 100A illustrated in FIG. 15 is a filter that attenuates a specific frequency component, and a notch filter is used, for example. A resonance point is present in a machine such as a machine tool driven by a motor, and resonance may increase in the servo control unit 100A. The resonance can be reduced using a notch filter. The output of the filter 110 is output to the servo motor 300 as a torque command. Expression 3

(indicated as Math. 3 below) indicates a transfer function G(s) of a notch filter as the filter 110. The parameter learned is coefficients $\omega_c$, $\zeta$, and R. The coefficient R in Expression 3 is an attenuation coefficient (a depth of notch), the coefficient $\omega_c$ is a central angular frequency of attenuation, and the coefficient $\zeta$ is a specific bandwidth (attenuation of notch). When the central frequency is fc and the bandwidth is fw, the coefficient $\omega_c$ is represented as $\omega_c=2\pi fc$, and the coefficient $\zeta$ is represented as $\zeta=fw/fc$.

$$G(s) = \frac{s^2 + 2\zeta R\omega_c s + \omega_c^2}{s^2 + 2\zeta\omega_c s + \omega_c^2} \qquad \text{[Math. 3]}$$

The machine learning device 200 learns the value Q of selecting an action A of adjusting the coefficients $\omega_c$, $\zeta$, and R of the transfer function G(s) of the filter 110 associated with a state S wherein the state S is a servo state such as commands and feedbacks including the position error information and the position commands of the servo control device 100A acquired by executing the learning machining program on the basis of the coefficients $\omega_c$, $\zeta$, and R of the transfer function G(s) of the filter 110. The machine learning device 200 receives a reward whenever the action A is executed. This reward is similar to that described in the first embodiment, and the reward output unit 2021 calculates an evaluation function value f(PD(S)) of the position error of the servo control device 100A operated on the basis of the filter 110 before correction associated with the state information S before being corrected by the action information A. Moreover, the reward output unit 2021 calculates an evaluation function value f(PD(S')) of the position error of the servo control device 100A operated on the basis of the filter 110 after correction associated with the state information S' corrected by the action information A. The reward output unit 2021 outputs a reward by comparing the evaluation function value f(PD(S)) and the evaluation function value f(PD(S')). The machine learning device 200 searches in trial-and-error manner for the optimal action A so that the total of the reward over the course of the future is maximized. By doing so, the machine learning device 200 can select an optimal action A (that is, the optimal coefficients $\omega_c$, $\zeta$, and R of the transfer function of the filter 110) with respect to the state S including the position error information and the position commands acquired by executing the learning machining program on the basis of the coefficients $\omega_c$, $\zeta$, and R of the transfer function of the filter 110.

That is, it is possible to select such an action A (that is, the coefficients $\omega_c$, $\zeta$, and R of the transfer function of the filter 110) that minimizes vibration of a machine end generated by execution of the learning machining program by selecting such an action A that maximizes the value of Q among the actions A applied to the coefficients $\omega_c$, $\zeta$, and R of the transfer function of the filter 110 associated with a certain state S on the basis of the value function Q learned by the machine learning device 200. The coefficients $\omega_c$, $\zeta$, and R of the transfer function of the filter 110 at a time point at which the Q-learning starts initially are set by a user in advance. In the present embodiment, the initial setting values of the coefficients $\omega_c$, $\zeta$, and R of the transfer function of the filter 110 created by the user are adjusted to optimal values by reinforcement learning. When an operator adjusts the machine tool in advance, machine learning may be performed using the adjusted values of the coefficients $\omega_c$, $\zeta$, and R as initial values. Although the coefficients $\omega_c$, $\zeta$, and R may be learned simultaneously, it is possible to reduce the amount of machine learning and shorten the setting time of machine learning when these coefficients are learned separately.

Figure 16:
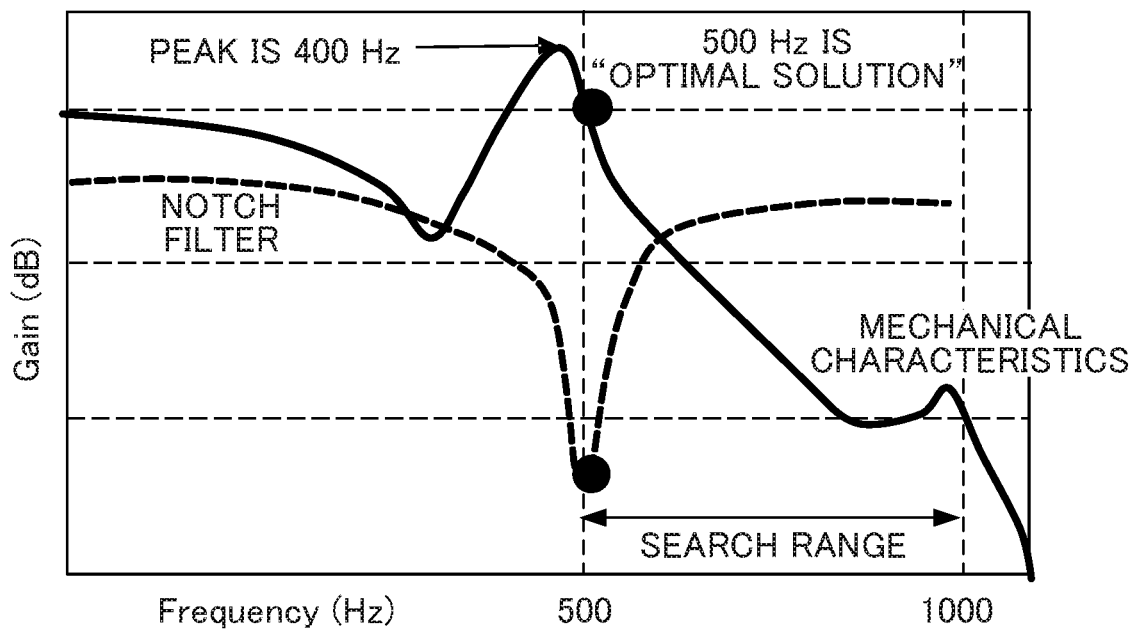
FIG. 16 is a characteristic diagram illustrating mechanical characteristics and notch filter characteristics at a frequency including a present search range.

When the search range is not an appropriate range, the machine learning device 200 changes the search range so that an appropriate search range is obtained with the aid of the search range setting unit 2024. As illustrated in FIG. 16, when the search range of the central frequency of attenuation ($\omega_c/2\pi$) of the notch filter is 500 Hz to 1000 Hz, 500 Hz which is the lower end is selected as an optimal search solution of the central frequency of attenuation $\omega_c/2\pi$ of the notch filter. However, the peak frequency of mechanical characteristics is 400 Hz which does not match the frequency of 500 Hz of the search solution of the central frequency of attenuation $\omega_c/2\pi$ of the notch filter. In the present embodiment, similarly to the first embodiment, when the peak frequency of mechanical characteristics does not match the frequency of the search solution of the central frequency of attenuation ($\omega_c/2\pi$) of the notch filter, the search range setting unit 2024 performs an operation of changing the search range so that the search solution of the central frequency of attenuation ($\omega_c/2\pi$) matches or approaches the peak of mechanical characteristics.

Figure 17:
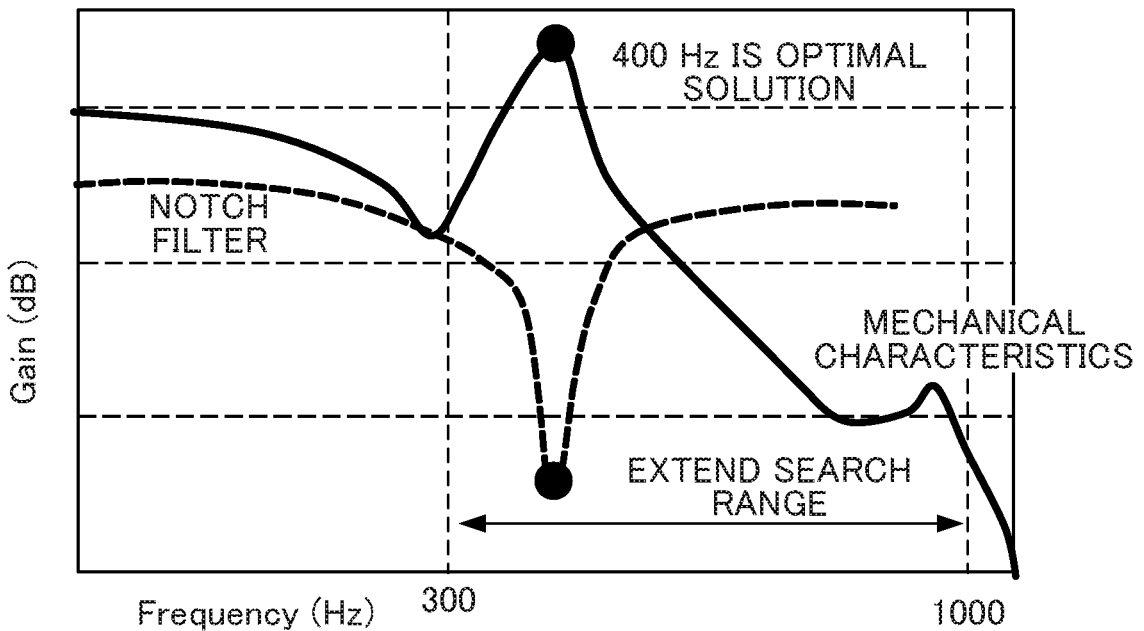
FIG. 17 is a characteristic diagram illustrating mechanical characteristics and notch filter characteristics at a frequency including a search range set newly.

Specifically, the search solution detection unit 2024A acquires a set of evaluation function values calculated by the reward output unit 2021, plots the set of evaluation function values in the search range (500 Hz to 1000 Hz) set presently, and detects whether the edge (500 Hz) of the search range is the search solution of the evaluation function value from the plotted curve of the evaluation function value. When the edge of the search range is the search solution of the evaluation function value, the evaluation function expression estimation unit 2024B estimates the evaluation function expression of the central frequency of attenuation of the notch filter from an evaluation function expression model on the basis of the evaluation function value obtained within the search range. The search range changing unit 2024C determines a new search range (300 Hz to 1000 Hz) and the number of searches from the shape of the estimated evaluation function expression. In this way, by setting the search range to 300 Hz to 1000 Hz by the search range changing operation of extending the search range of the search range setting unit as illustrated in FIG. 17, it is possible to set the search solution to 400 Hz and to suppress vibration. The central angular frequency of attenuation $\omega_c$ corresponds to the coefficient $\omega_c$ of the transfer function of the filter 110 and serves as a first parameter. The central frequency of attenuation ($\omega_c/2\pi$) serves as a second parameter used for searching for the first parameter ($\omega_c$). In the above description, although the search range is defined by the central frequency of attenuation ($\omega_c/2\pi$) of the notch filter, the search range may be defined by the central angular frequency of attenuation $\omega_c$.

In FIG. 17, although the edge of the search range set presently is extended, the search range may be set so as to overlap a portion of a search range set presently or the search range may be set to another range different from the search range set presently. The above-described operation is applied to a case where the search range of the coefficients $\zeta$ and R of the filter 110 is not appropriate.

Third Embodiment

Figure 18:
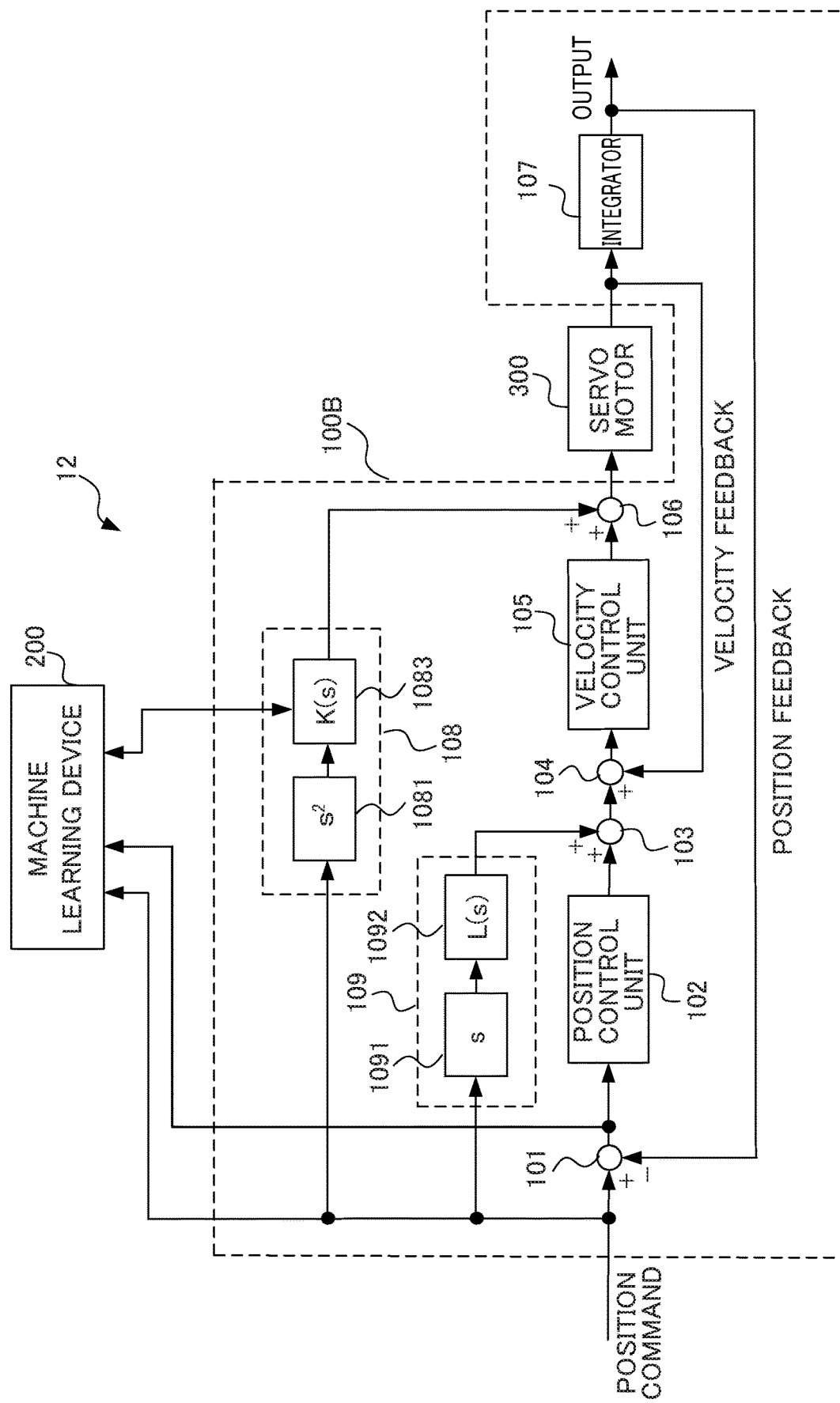
FIG. 18 is a block diagram illustrating a configuration example of a control device according to a third embodiment of the present disclosure.

FIG. 18 is a block diagram illustrating a configuration example of a control device according to a third embodiment of the present disclosure. The control device 12 illustrated in FIG. 18 includes a servo control device 100B and a machine learning device 200. In FIG. 18, the components which are the same as the components illustrated in FIG. 1 will be denoted by the same reference numerals, and the description thereof will be omitted.

The servo control device 100B of the present embodiment illustrated in FIG. 18 is different from the servo control device 100 illustrated in FIG. 1 in that the IIR filter unit 1082 of the velocity feedforward unit 108 is replaced with a velocity feedforward processing unit 1083, and the position feedforward unit 109 includes a differentiator 1091 and a position feedforward processing unit 1092. The machine learning device 200 has the same configuration and performs the same operation as those of the machine learning device of the first embodiment described with reference to FIG. 6 to 14 except that the state information and the action information are different from that of the machine learning device of the first embodiment due to a difference in configuration of the servo control device and the operation based on the difference in the state information and the action information is different from that of the machine learning device of the first embodiment. Hereinafter, the configuration and the operation of the servo control device and the operation of the machine learning device different from those of the first embodiment will be described. In the velocity feedforward unit 108, the double differentiator 1081 differentiates the position command twice, and the velocity feedforward processing unit 1083 performs a velocity feedforward process and outputs the processing result to the adder 106 as a velocity feedforward term. A transfer function of a numerical model of the velocity feedforward processing unit 1083 is a transfer function K(s) represented by Expression 4 (indicated as Math. 4 below). The optimal values of the coefficients $c_i$ and $d_j$ ($0 \le i \le m$, $0 \le j \le n$, and m and n are natural numbers) of Expression 4 are machine-learned by the machine learning device 200.

[Math. 4]

$$K(s) = \frac{d_0 + d_1 s + d_2 s^2 + \ldots + d_n s^n}{c_0 + c_1 s + c_2 s^2 + \ldots + c_m s^m}$$

In the position feedforward unit 109, the differentiator 1091 differentiates the position command, and the position feedforward processing unit 1092 performs a position feedforward process and outputs the processing result to the adder 103 as a position feedforward term. The transfer function of a numerical model of the position feedforward processing unit 1092 is a transfer function L(s) represented by Expression 5 (indicated as Math. 5 below). The optimal values of the coefficients $e_i$ and $f_j$ ($9 \le i \le m$, $0 < j \le n$, and m and n are natural numbers) of Expression 5 are machine-learned by the machine learning device 200.

[Math. 5]

$$L(s) = \frac{f_0 + f_1 s + f_2 s^2 + \ldots + f_n s^n}{e_0 + e_1 s + e_2 s^2 + \ldots + e_m s^m}$$

In the third embodiment, the machine learning device 200 learns the coefficients $c_i$ and $d_j$ of the transfer function K(s) of the velocity feedforward processing unit 1083 and the coefficients $e_i$ and $f_j$ of the transfer function L(s) of the position feedforward processing unit 1092. In the third embodiment, the machine learning device 200 performs learning of the coefficients $c_i$ and $d_j$ of the transfer function K(s) of the velocity feedforward processing unit 1083 separately from learning of the coefficients $e_i$ and $f_j$ of the transfer function L(s) of the position feedforward processing unit 1092, and specifically, performs the learning of the coefficients $c_i$ and $d_j$ of the transfer function K(s) of the velocity feedforward processing unit 1083 on the inner side (the inner loop) than the position feedforward processing unit 1092 earlier than the learning of the coefficients $e_i$ and $f_j$ of the transfer function L(s) of the position feedforward processing unit 1092. Specifically, the machine learning device 200 fixes the coefficients $e_i$ and $f_j$ of the transfer function L(s) of the position feedforward processing unit 1092 and learns the optimal values of the coefficients $c_i$ and $d_j$ of the transfer function K(s) of the velocity feedforward processing unit 1083. After that, the machine learning device 200 fixes the coefficients $c_i$ and $d_j$ of the transfer function K(s) of the velocity feedforward processing unit 1083 to the optimal values obtained by learning and learns the coefficients $e_i$ and $f_j$ of the transfer function L(s) of the position feedforward processing unit 1092. By doing so, the machine learning device 200 can perform learning related to optimization of the coefficients $e_i$ and $f_j$ of the transfer function L(s) of the position feedforward processing unit 1092 under the condition of the velocity feedforward term optimized by learning and can suppress fluctuation of the position error. Therefore, by performing the learning of the coefficients $c_i$ and $d_j$ of the transfer function K(s) of the velocity feedforward processing unit 1083 on the inner side (the inner loop) than the position feedforward processing unit 1092 earlier than the learning of the coefficients $e_i$ and $f_j$ of the transfer function L(s) of the position feedforward processing unit 1092, it is possible to suppress fluctuation of the position error and realize high accuracy.

First, the machine learning device 200 learns the value Q of selecting an action A of adjusting the values of the coefficients $c_i$ and $d_j$ of the transfer function K(s) of the velocity feedforward processing unit 1083 associated with a state S wherein the state S is a servo state such as commands and feedbacks including the values of the coefficients $c_i$ and $d_j$ ($0 \le i \le m$, $0 \le j \le n$, and m and n are natural numbers) of the transfer function K(s) of the velocity feedforward processing unit 1083 in the servo control device 100B and the position error and the position commands of the servo control device 100B acquired by executing the learning machining program.

The machine learning device 200 observes the state information S including the servo state such as commands and feedbacks including the position commands and the position error information of the servo control device 100B at the positions A1 and A3 and the positions B1 and B3 of the machining shape by executing the learning machining program on the basis of the coefficients $c_i$ and $d_j$ of the transfer function K(s) of the velocity feedforward processing unit 1083 to determine the action A. The machine learning device 200 receives a reward whenever the action A is executed. This reward is similar to that described in the first embodiment/and the reward output unit 2021 calculates an evaluation function value f(PD(S)) of the position error of the servo control device 100B operated on the basis of the filter 110 before correction associated with the state information S before being corrected by the action information A. Moreover, the reward output unit 2021 calculates an evaluation function value f(PD(S')) of the position error of the servo control device 100B operated on the basis of the filter 110 after correction associated with the state information S' corrected by the action information A. The reward output unit 2021 outputs a reward by comparing the evaluation function value f(PD(S)) and the evaluation function value f(PD(S')). The machine learning device 200 searches in trial-and-error manner for the optimal action A so that the total of the reward over the course of the future is maximized. By doing so, the machine learning device 200 can select an optimal action A (that is, the optimal coefficients $c_i$ and $d_j$ of the velocity feedforward processing unit 1083) with respect to the state S including the servo state such as commands and feedbacks including the position commands and the position error of the servo control device 100B acquired by executing the learning machining program on the basis of the coefficients $c_i$ and $d_j$ of the transfer function K(s) of the velocity feedforward processing unit 1083. The rotation direction of the servo motor in the X-axis direction and the Y-axis direction does not change at the positions A1 and A3 and the positions B1 and B3, and the machine learning device 200 can learn the coefficients $c_i$ and $d_j$ of the transfer function of the velocity feedforward processing unit 1083 during linear operation.

That is, the machine learning device 200 can select an action A (that is, the coefficients $c_i$ and $d_j$ of the velocity feedforward processing unit 1083) that minimizes the position error acquired by executing the machining program during learning by selecting an action A that maximizes the value of Q from among the actions A applied to the coefficients a and $d_j$ of the transfer function K(s) of the velocity feedforward processing unit 1083 associated with a certain state S on the basis of the value function Q learned by the machine learning device 200. The coefficients $c_i$ and $d_j$ of the velocity feedforward processing unit 1083 at a time point at which the Q-learning starts initially are set by a user in advance. In the present embodiment, the initial values of the coefficients $c_i$ and $d_j$ of the velocity feedforward processing unit 1083 created by the user are adjusted to optimal values by the reinforcement learning. The initial values of the coefficients $c_i$ and $d_j$ of the velocity feedforward processing unit 1083 are set such that, for example, in Expression 4, $c_0=1$, $c_1=0$, $c_2=0$, . . . , and $c_m=0$, and $d_0=1$, $d_1=0$, $d_2=0$, . . . , and $d_n=0$. The dimensions m and n of the coefficients ci and dj are set in advance. That is, $0 \le i \le m$ for $c_i$, and $0 \le j \le n$ for $d_j$. When an operator adjusts the machine tool in advance, machine learning may be performed using the adjusted values of the coefficients $c_j$ and $d_j$ as initial values.

When the learning of the coefficients $c_i$ and $d_j$ of the transfer function K(s) of the velocity feedforward processing unit 1083 ends, the learning of the coefficients $e_i$ and $f_j$ of the transfer function L(s) of the position feedforward processing unit 1092 starts, and the coefficients $e_i$ and $f_j$ of the transfer function L(s) of the position feedforward processing unit 1092 is performed similarly to the learning of the coefficients $c_i$ and $d_j$ of the transfer function K(s) of the velocity feedforward processing unit 1083.

Moreover, in the machine learning device 200, similarly to the first embodiment, during learning of the coefficients $c_i$ and $d_j$ of the transfer function K(s) of the velocity feedforward processing unit 1083 and learning of the coefficients $e_i$ and $f_j$ of the transfer function L(s) of the position feedforward processing unit 1092, when the search range is not an appropriate range, the search range setting unit 2024 changes the search range so that an appropriate search range is obtained. In the present embodiment, similarly to the first embodiment, when the peak frequency of mechanical characteristics does not match the central frequency of attenuation of filter characteristics determined by the search solution of the coefficients $c_i$ and $d_j$ or the coefficients $e_i$ and $f_j$ of the velocity feedforward processing unit 1083 or the position feedforward processing unit 1092, the search range setting unit 2024 performs an operation of changing the search range of the coefficients $c_i$ and or $d_j$ and so that the central frequency of attenuation of filter characteristics matches the peak of mechanical characteristics.

Specifically, the search solution detection unit 2024A acquires a set of evaluation function values calculated by the reward output unit 2021, plots the set of evaluation function values in the search range of the coefficients $c_i$ and $d_j$ or the coefficients $e_i$ and $f_j$ set presently, and detects whether the edge of the search range is the search range of the evaluation function value from the plotted curve of the evaluation function value. When the edge of the search range is the search solution of the evaluation function value, the evaluation function expression estimation unit 2024B estimates the evaluation function expression of the coefficients $c_i$ and $d_j$ or the coefficients $e_i$ and $f_j$ from an evaluation function expression model on the basis of the evaluation function value obtained within the search range. The search range changing unit 2024C determines a new search range and the number of searches from the shape of the estimated evaluation function expression. In this way, by the search range changing operation of extending the search range of the search range setting unit, it is possible to adjust the central frequency of attenuation of the filter characteristics of the velocity feedforward processing unit 1083 or the position feedforward processing unit 1092 so as to match the peak frequency of mechanical characteristics and to suppress vibration. The coefficients $c_i$ and $d_j$ or the coefficients $e_i$ and $f_j$ serve as a first parameter.

In the above description, although the edge of the search range set presently is extended, the search range may be set so as to overlap a portion of a search range set presently or the search range may be set to another range different from the search range set presently.

While respective embodiments of the present invention have been described, the components included in the machine learning device and the servo control device may be realized by hardware, software or a combination thereof. The servo control method performed by cooperation of the components included in the servo control device described above may also be realized by hardware, software, or a combination thereof. Here, being realized by software means being realized by a computer reading and executing a program.

The programs can be stored on any of various types of non-transitory computer readable media and be provided to a computer. The non-transitory computer readable media include various types of tangible storage media. Examples of the non-transitory computer readable media include a magnetic recording medium (such as a flexible disk or a hard disk drive), a magneto-optical recording medium (such as a magneto-optical disk), a CD-ROM (Read Only Memory), a CD-R, a CD-R/W, a semiconductor memory (such as a mask ROM, a PROM (Programmable ROM), an EPROM (Erasable PROM), a flash ROM, or a RAM (Random Access Memory)).

The above-described embodiments are preferred embodiments of the present invention; however, the scope of the present invention is not limited to the embodiments and examples only, and the present invention can be embodied in various modifications without departing from the spirit of the present invention.

<Modification in which Machine Learning Device is Included in Servo Control Device>

In the above-described embodiments, the first to third embodiments in which the machine learning device 200 and the servo control devices 100, 100A, and 100B form the control device 10, 11, and 12 has been described. In these embodiments, although the machine learning device 200 and the servo control device 100 are configured as separate devices, one of these devices may be integrated with another device. For example, some or all of the functions of the machine learning device 200 may be realized by the servo control device 100.

<Freedom in System Configuration>

Figure 19:
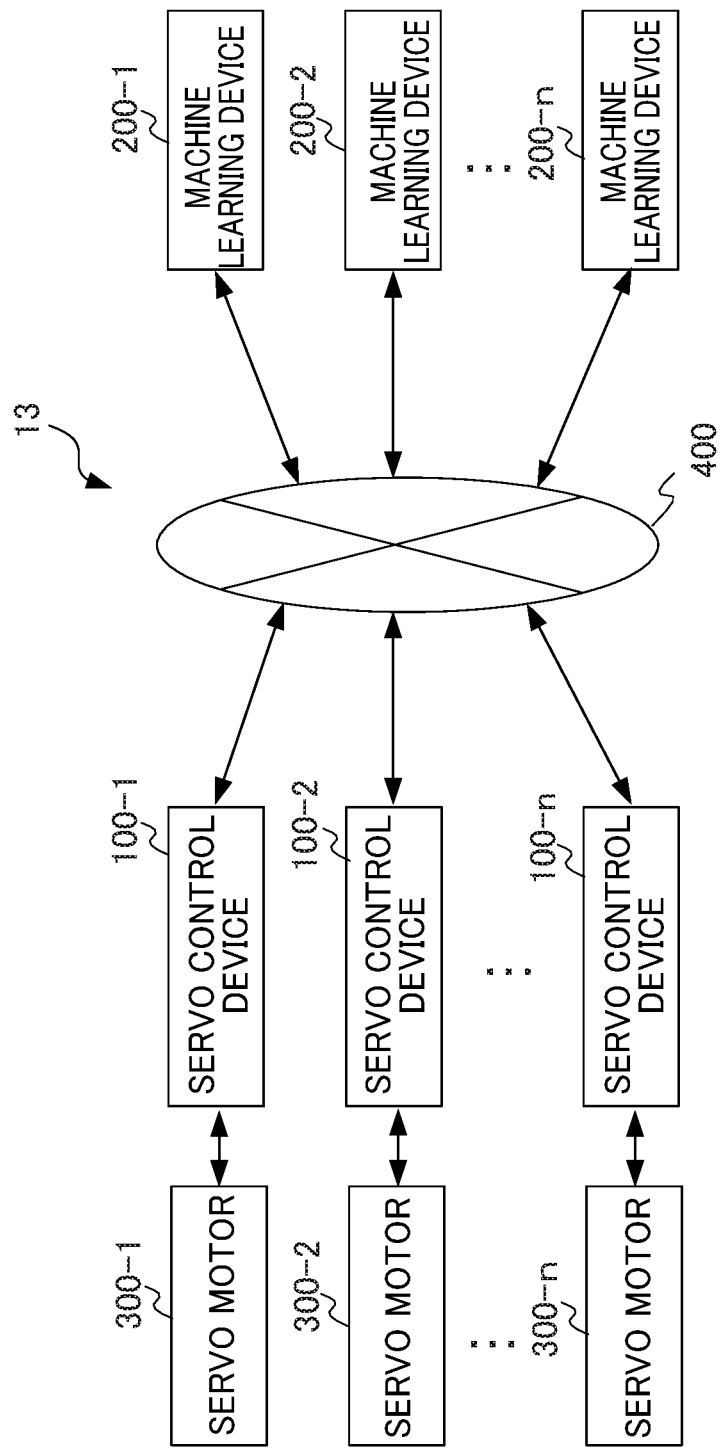
FIG. 19 is a block diagram illustrating a control device of another configuration.

FIG. 19 is a block diagram illustrating a control device having another configuration. As illustrated in FIG. 19, a control device 13 includes n machine learning devices 200-1 to 200-n, n servo control devices 100-1 to 100-n, n servo motors 300-1 to 300-n, and a network 400. Here, n is an arbitrary natural number. Each of the n machine learning devices 200-1 to 200-n corresponds to the machine learning device 200 illustrated in FIG. 6. Each of the n servo control devices 100-1 to 100-n corresponds to any one of the servo control device 100 illustrated in FIG. 1, the servo control device 100A illustrated in FIG. 15, and the servo control device 100B illustrated in FIG. 18.

Although the n pairs of the machine learning device 200-1 to 200-n and the servo control devices 100-1 to 100-n are connected via the network 400 in FIG. 19, the n pairs of the machine learning devices 200-1 to 200-n and the servo control devices 100-1 to 100-n may be connected directly via connection interfaces, respectively. A plurality of n pairs of the machine learning devices 200-1 to 200-n and the servo control devices 100-1 to 100-n may be, for example, provided in the same plant or may be provided in different plants, respectively.

The network 400 is, for example, a local area network (LAN) constructed in a plant, the Internet, a public telephone network, or a combination thereof. The specific communication scheme of the network 600, as well as whether the network uses a cable connection or a wireless connection, and the like are not particularly limited.

In the control device illustrated in FIG. 19, although the machine learning devices 200-1 to 200-n and the servo control devices 100-1 to 100-n are communicably connected as a one-to-one correspondence, one machine learning device 200-1 may be communicably connected to a plurality of servo control devices 100-1 to 100-m (m<n or m=n) via the network 400, and one machine learning device 200-1 may perform machine learning of the servo control devices 100-1 to 100-m. In this case, a distributed processing system may be adopted, in which the respective functions of the machine learning device 200-1 are distributed to a plurality of servers as appropriate. The functions of the machine learning device 200-1 may be realized by utilizing a virtual server function, or the like, in a cloud. When there is a plurality of machine learning devices 200-1 to 200-n respectively corresponding to a plurality of servo control devices 100-1 to 100-n of the same type name, the same specification, or the same series, the machine learning devices 200-1 to 200-n may be configured to share the learning results in the machine learning devices 200-1 to 200-n. By doing so, a further optimal model can be constructed.

EXPLANATION OF REFERENCE NUMERALS 10, 11, 12, 13: Control device
100, 100A, 100B: Servo control device
200: Machine learning device
201: State information acquisition unit
202: Learning unit
203: Action information output unit
204: Value function storage unit
205: Optimization action information output unit
2021: Reward output unit
2022: Value function updating unit
2023: Action plan generation unit
2024: Search range setting unit
300: Servo motor
400: Network

What is claimed is:

1. A machine learning device that searches for a first parameter of a component of a servo control device that controls a servo motor that controls an axis of a machine tool, a robot, or an industrial machine, the machine learning device comprising:
a search solution detection unit that acquires a set of evaluation function values used for machine learning device during machine learning or after machine learning, plots the set of evaluation function values in a search range of the first parameter or a second parameter used for searching for the first parameter, and detects whether a search solution is at an edge of the search range or is in a predetermined range from the edge;
an evaluation function expression estimation unit that estimates an evaluation function expression on the basis of the set of evaluation function values when the search solution is at the edge of the search range or is in the predetermined range; and
a search range changing unit that changes the search range to a new search range of the first parameter or the second parameter on the basis of the estimated evaluation function expression.

2. The machine learning device according to claim 1, wherein
the evaluation function expression estimation unit estimates the evaluation function expression using an evaluation function expression model of a polynomial expression of the first parameter or the second parameter.

3. The machine learning device according to claim 1, wherein
the first parameter of the component of the servo control device includes a parameter of a numerical model or a filter.

4. The machine learning device according to claim 3, wherein
the component is a velocity feedforward unit or a position feedforward unit, and the first parameter includes a coefficient of a transfer function of a filter.

5. The machine learning device according to claim 3, wherein
the component is a notch filter, and the first parameter is a coefficient of a transfer function of the notch filter.

6. A control device comprising:
the machine learning device according to claim 1; and
a servo control device that controls a servo motor that drives an axis of a machine tool, a robot, or an industrial machine, wherein
the machine learning device searches for a first parameter of a component of the servo control device.

7. A search range setting method in a machine learning device that searches for a first parameter of a component of a servo control device that controls a servo motor that controls an axis of a machine tool, a robot, or an industrial machine, the search range setting method comprising:
plotting a set of evaluation function values used for machine learning during machine learning or after machine learning in a search range of the first parameter or a second parameter used for searching for the first parameter;

detecting whether a search solution is at an edge of the search range or is in a predetermined range from the edge;

estimates an evaluation function expression on the basis of the set of evaluation function values when the search solution is at the edge of the search range or is in the predetermined range; and changes the search range to a new search range of the first parameter or the second parameter on the basis of the estimated evaluation function expression.

\* \* \* \* \*